(12) United States Patent
Koike et al.

(10) Patent No.: US 6,920,778 B2
(45) Date of Patent: Jul. 26, 2005

(54) DEVICE FOR DETECTING LEAKAGE OF LIQUID IN TANK

(75) Inventors: Atsushi Koike, Ageo (JP); Kiyoshi Yamagishi, Ageo (JP); Takayuki Takahata, Ageo (JP); Toshimi Nakamura, Ageo (JP); Toshiaki Kawanishi, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 10/498,433

(22) PCT Filed: Dec. 13, 2002

(86) PCT No.: PCT/JP02/13077

§ 371 (c)(1),
(2), (4) Date: Jun. 10, 2004

(87) PCT Pub. No.: WO03/052372

PCT Pub. Date: Jun. 26, 2003

(65) Prior Publication Data

US 2005/0011253 A1 Jan. 20, 2005

(30) Foreign Application Priority Data

| Jan. 18, 2002 | (JP) | ................................. | 2002-010147 |
| Jan. 18, 2002 | (JP) | ................................. | 2002-010148 |
| Jan. 25, 2002 | (JP) | ................................. | 2002-017384 |
| Dec. 14, 2002 | (JP) | ................................. | 2001-381756 |

(51) Int. Cl.$^7$ .............................................. G01M 3/04
(52) U.S. Cl. ........................................................ 73/49.2
(58) Field of Search ............................ 73/49.2; 340/605

(56) References Cited

U.S. PATENT DOCUMENTS

| 3,331,245 A | * | 7/1967 | Barker | ...................... | 73/313 |
| 3,650,151 A | * | 3/1972 | Drexel | ................... | 73/861.04 |
| 4,791,814 A | * | 12/1988 | Nee | ........................... | 73/49.2 |
| 4,862,734 A | * | 9/1989 | Elderton | ...................... | 73/49.2 |
| 4,893,498 A | * | 1/1990 | Jensen | ........................ | 73/49.2 |

(Continued)

FOREIGN PATENT DOCUMENTS

| JP | 62-223640 | | 10/1962 | |
| JP | 58168935 A | * | 10/1983 | ............ G01M/3/32 |
| JP | 60-95539 | | 6/1985 | |
| JP | 4-236900 A | | 8/1992 | |
| JP | 11-118566 A | | 11/1994 | |
| JP | 8-327491 A | | 12/1996 | |
| JP | 10-120099 A | | 5/1998 | |
| JP | 2001-235356 A | | 8/2001 | |

*Primary Examiner*—Hezron Williams
*Assistant Examiner*—John Fitzgerald
(74) *Attorney, Agent, or Firm*—Frommer Lawrence & Haug LLP; Ronald R. Santucci

(57) ABSTRACT

A device placed in a tank and used for detecting a leakage of liquid in the tank. Vertical measurement tube passages (10, 14) into which the liquid in the tank is introduced have a measurement tube (10) and a measurement thin tube (14). The measurement thin tube (14) communicates with the measurement tube and is located lower than the measurement tube. The measurement thin tube has a cross-sectional area that is equal to or smaller than $\frac{1}{50}$ of that of the measurement tube. A thermal flow sensor (16) used for measuring a liquid flow rate is attached to the measurement thin tube (14). There is provided leakage detecting means (22) for detecting a leakage of liquid in the tank according to the flow rate value measured by the sensor. The leakage detecting means generates a leakage detection signal when a flow rate value measured by the sensor is within a range greater than 0 and smaller than the flow rate value obtained when liquid is added to the tank or when the liquid in the tank is taken out. Thus, even a leakage of a very small amount is detected easily and accurately without stopping the use of the tank.

53 Claims, 28 Drawing Sheets

U.S. PATENT DOCUMENTS

| | | | | |
|---|---|---|---|---|
| 4,964,296 A | * | 10/1990 | Jensen | 73/49.2 |
| 4,967,592 A | * | 11/1990 | Lagergren et al. | 73/49.2 |
| 5,086,644 A | * | 2/1992 | Schendel | 73/49.2 |
| 5,088,317 A | * | 2/1992 | Jensen | 73/49.2 |
| 5,131,264 A | * | 7/1992 | Jensen | 73/49.2 |
| 5,189,904 A | * | 3/1993 | Maresca et al. | 73/40.5 R |
| 5,254,976 A | * | 10/1993 | Schueler | 340/605 |
| 5,284,048 A | * | 2/1994 | Horner | 73/49.2 |
| 5,375,455 A | * | 12/1994 | Maresca et al. | 73/40.5 R |
| 5,445,010 A | * | 8/1995 | Peacock | 73/49.2 |
| 5,767,393 A | * | 6/1998 | Robertson | 73/49.2 |
| 5,861,547 A | * | 1/1999 | Kawai et al. | 73/49.2 |

* cited by examiner

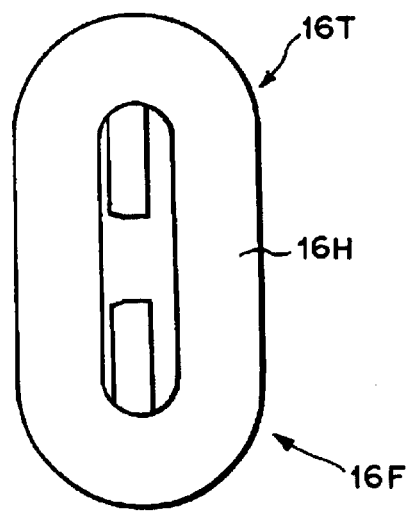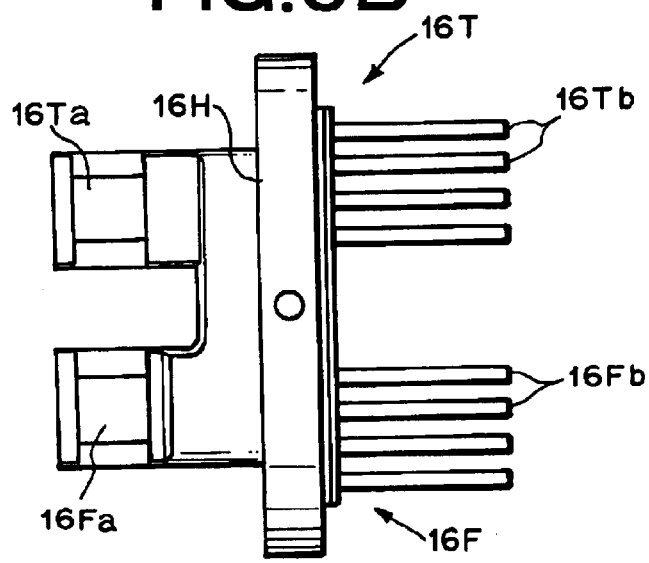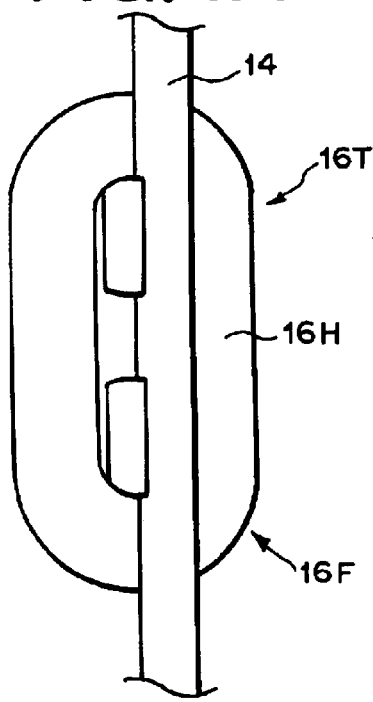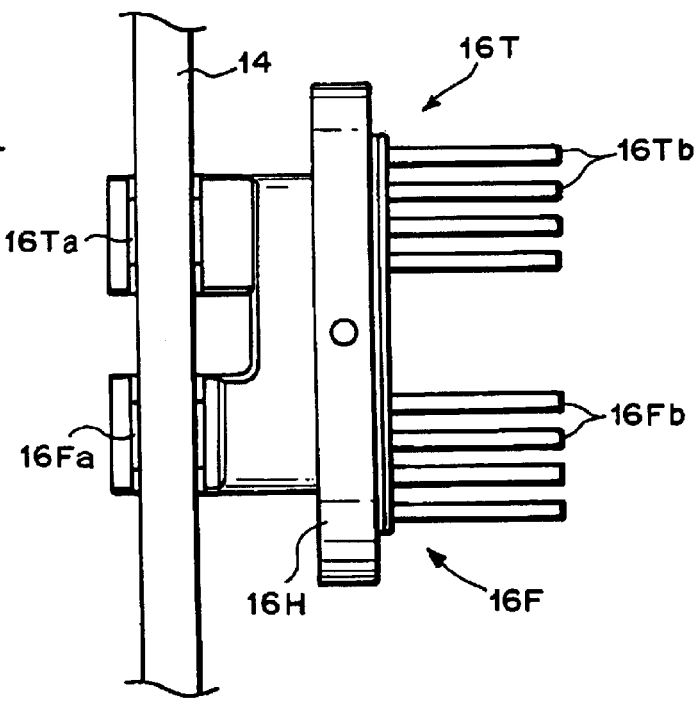

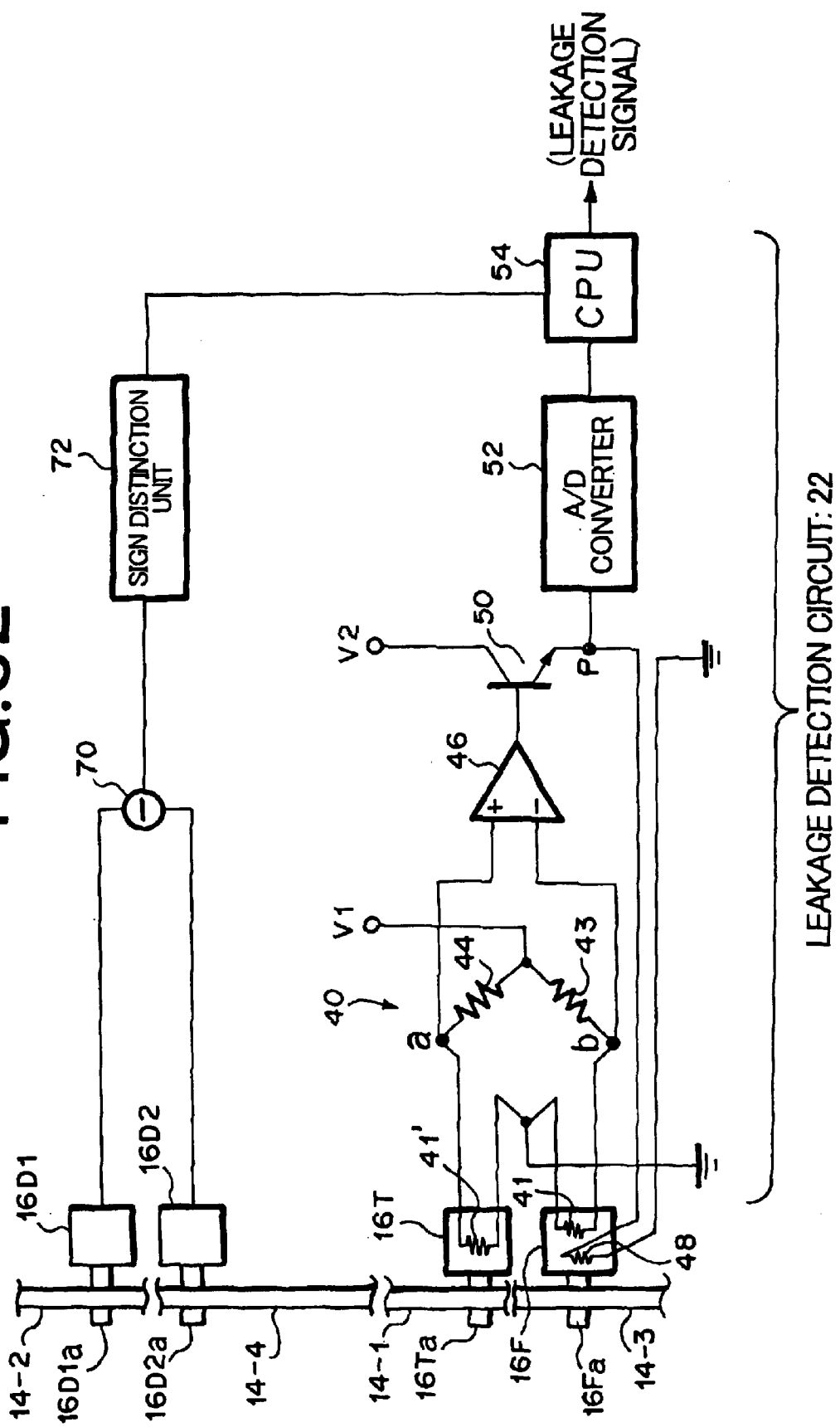

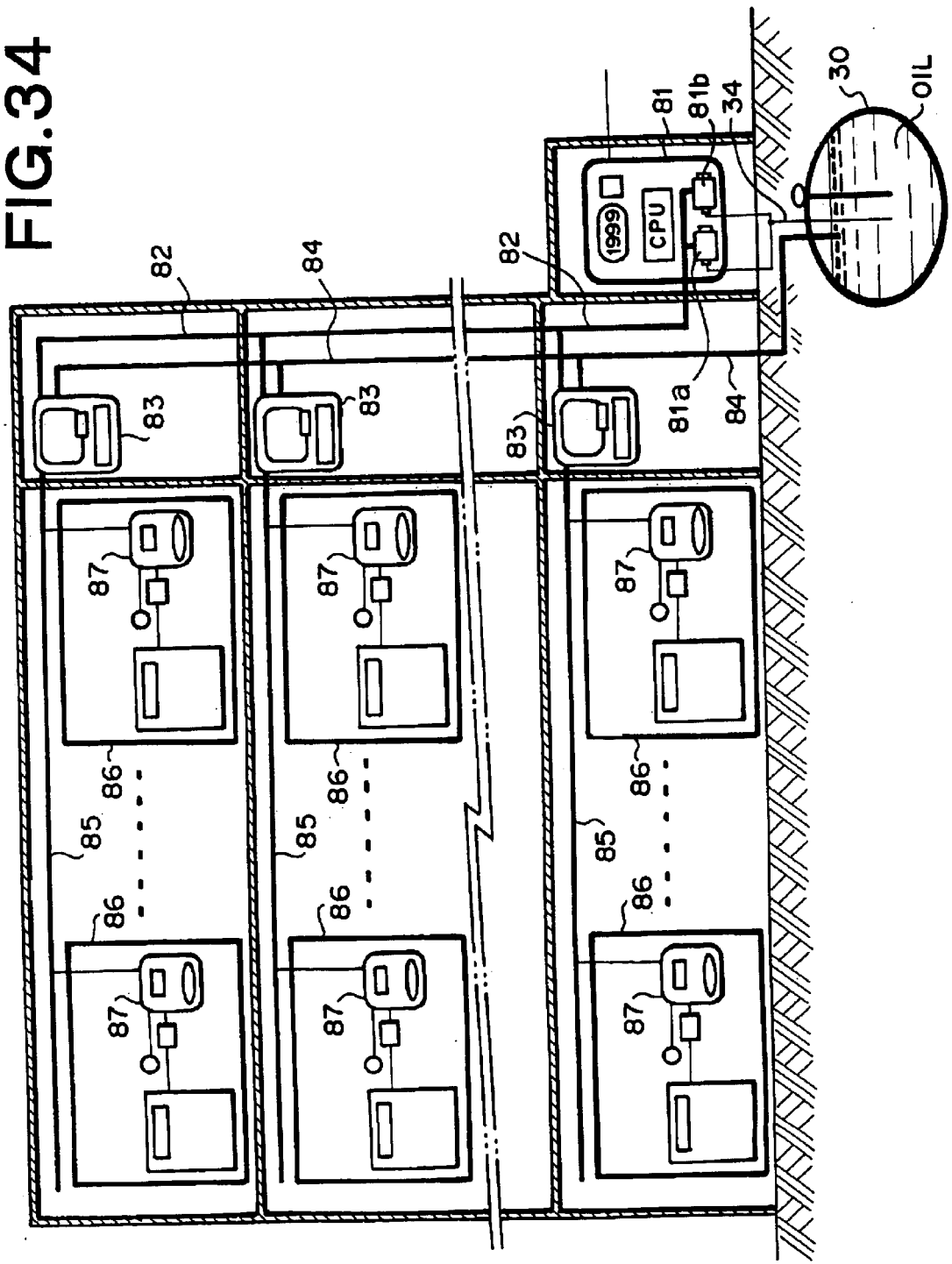

DEVICE FOR DETECTING LEAKAGE OF LIQUID IN TANK

This application is a 371 of PCT/JPO2/13077 filed on Dec. 13, 2002, published on Jun. 26, 2003 under publication number WO 03/052372 A1 which claims priority benefits from Japanese Patent Application No. 2001-381756 filed Dec. 14, 2001 and Japanese Patent Application No. 2002-10147 filed Jan. 18, 2002 and Japanese Patent Application No. 2002-10148 filed Jan. 18, 2002 and Japanese Patent Application Number 2002-17384 filed Jan. 25, 2002.

TECHNICAL FIELD

The present invention relates to a device for detecting leakage of liquid in a tank, particularly to a device for detecting a liquid leakage from a tank based on a flow of liquid.

A liquid leakage detection device of the present invention is preferably used, for example, for detecting a small amount of liquid leakage from a fuel oil tank such as a petroleum tank buried underground or tanks of various liquid chemicals.

BACKGROUND ART

Most of fuel oil tanks in gas stations or the like have heretofore been buried underground. In the underground tank, micro-cracks are generated in a short time by degradation with the lapse of time, and there is a very strong possibility that oil leakage occurs. When the tank reaches this situation, ambient pollution is caused, and recovery requires enormous expenses. Therefore, in the underground fuel oil tank, presence/absence of oil leakage (or tank cracks which cause the leakage) is obliged to be periodically detected.

As a method which has heretofore been used for this oil leakage detection, there is a method in which gases such as air are pressurized and injected into the tank in a sealed state of the tank, and presence/absence of a pressure decrease after the lapse of a predetermined time is detected. Conversely, there is a method in which a pressure in the tank is reduced in the sealed state of the tank, and the presence/absence of a pressure increase after the lapse of the predetermined time is detected. However, in these methods, an operation for sealing all openings of the tank with putty or the like is required prior to a leakage detection operation, an operation for stopping the use of the tank to remove all oil from the tank is required as the case may be, and the operation becomes very troublesome. Additionally, when the tank is not completely sealed, the leakage detected in these methods does not necessarily reflect actual oil leakage based on tank cracks or the like, and detection precision is not so high for a trouble of the detection operation.

On the other hand, as another method of liquid leakage detection, as described, for example, in JP-A-62-223640 and JP-A-10-120099, there is a method in which a fluctuation of a liquid level is detected. In this method, the fluctuation of the liquid level is measured based on a volume change of the liquid in the tank by the leakage, and therefore detection is possible while the leakage is accurately reflected. However, in this method, when a leakage amount is small, the fluctuation of the liquid level is remarkably small, and it is therefore remarkably difficult to detect the fluctuation.

To quickly cope with the leakage of the liquid in the tank, it is important to detect the leakage in an early stage in which the cracks of the tank are small and the leakage is little. Therefore, when the detection of a small amount of leakage is demanded, the method of detecting the fluctuation of the liquid level can not sufficiently meet the demand.

Therefore, an object of the present invention is to provide a device for detecting leakage of liquid in a tank, which is capable of detecting even a small amount of leakage easily and accurately.

Moreover, an object of the present invention is to provide a device for detecting leakage of liquid in a tank, which is capable of detecting leakage without stopping the use of the tank.

Furthermore, an object of the present invention is to provide a device for detecting leakage of liquid in a tank, which can be attached to the existing tank without any special working.

Additionally, an object of the present invention is to provide a device for detecting leakage of liquid in a tank, which is capable of grasping a leakage amount accurately.

DISCLOSURE OF THE INVENTION (1) In order to achieve the above object, there is provided a device for detecting leakage of liquid in a tank, which is inserted into the tank to detect the leakage of liquid in the tank, comprising:

a measurement tube passage into which the liquid in the tank is introduced, the measurement tube passage including a measurement tube and a measurement thin tube communicating with the measurement tube and positioned below the measurement tube and having a cross-sectional area smaller than that of the measurement tube;

a sensor for use in measuring a flow rate of the liquid in the measurement thin tube, the sensor being attached to the measurement thin tube; and leakage detection means for detecting the leakage of the liquid in the tank based on the flow rate measured using the sensor.

In an aspect of the present invention, the cross-sectional area of the measurement thin tube is 1/50 or less, preferably 1/100 or less, more preferably 1/300 or less of that of the measurement-tube. In an aspect of the present invention, the measurement tube and the measurement thin tube are directed substantially in a vertical direction.

In an aspect of the present invention, the sensor is a thermal flow rate sensor. In an aspect of the present invention, the thermal flow rate sensor includes a flow rate detection section and a temperature detection section, and the leakage detection means obtains the flow rate subjected to temperature compensation by an electric circuit comprising the flow rate detection section and the temperature detection section. In an aspect of the present invention, either of the flow rate detection section and the temperature detection section comprises a heat transfer member which contacts the outer surface of the measurement thin tube.

In an aspect of the present invention, the leakage detection means emits a leakage detection signal, when the flow rate measured using the sensor is in a range greater than 0 and smaller than a flow rate value obtained during liquid replenishment into the tank or liquid pumping-out from the tank.

In an aspect of the present invention, the measurement tube passage is formed through a sheath tube and a sensor holder member attached to a lower part of the sheath tube, the sensor holder member holds the sensor, and the measurement thin tube is disposed through the sensor holder member. In an aspect of the present invention, a cap member is attached to an upper part of the sheath tube, and the cap member is provided with a communication path for allowing the measurement tube to communicate with the outside and means for fixing the device to an opening of the tank.

(2) In order to achieve the above object, there is provided a device for detecting leakage of liquid in a tank, which is inserted into the tank to detect the leakage of liquid in the tank, comprising:

a measurement tube passage into which the liquid in the tank is introduced, the measurement tube passage including a measurement tube and a measurement thin tube communicating with the measurement tube and positioned below the measurement tube and having a cross-sectional area smaller than that of the measurement tube;

a sensor for use in measuring a flow rate of the liquid in the measurement thin tube, the sensor being attached to the measurement thin tube;

liquid level detection means for use in detecting a height of a surface of the liquid; and leakage detection means for detecting the leakage of the liquid in the tank based on a corrected flow rate obtained by correcting the flow rate measured using the sensor based on a liquid level detected using the liquid level detection means and a value of a parameter concerning the shape of the tank.

In an aspect of the present invention, the cross-sectional area of the measurement thin tube is $1/50$ or less, preferably $1/100$ or less, more preferably $1/300$ or less of that of the measurement tube. In an aspect of the present invention, the measurement tube and the measurement thin tube are directed substantially in a vertical direction.

In an aspect of the present invention, the sensor is a thermal flow rate sensor. In an aspect of the present invention, the thermal flow rate sensor comprises a flow rate detection section and a temperature detection section, and the leakage detection means obtains the flow rate subjected to temperature compensation by an electric circuit comprising the flow rate detection section and the temperature detection section. In an aspect of the present invention, either of the flow rate detection section and the temperature detection section comprises a heat transfer member which contacts the outer surface of the measurement thin tube.

In an aspect of the present invention, the liquid level detection means is a pressure sensor which detects a liquid pressure received from the liquid in the tank. In an aspect of the present invention, the parameter concerning the shape of the tank is a ratio of an effective cross-sectional area of the tank with respect to the cross-sectional area of the measurement tube in an equal height, and the corrected flow rate is obtained by multiplying the flow rate by the value of the parameter in the liquid level. In an aspect of the present invention, the leakage detection means emits a leakage detection signal, when the corrected flow rate is in a range greater than 0 and smaller than a corrected flow rate value obtained during liquid replenishment into the tank or liquid pumping-out from the tank.

In an aspect of the present invention, the measurement tube passage is formed through a sheath tube and a sensor holder member attached to a lower part of the sheath tube, the sensor holder member holds the sensor and the liquid level detection means, and the measurement thin tube is disposed through the sensor holder member. In an aspect of the present invention, a cap member is attached to an upper part of the sheath tube, and the cap member is provided with a communication path for allowing the measurement tube to communicate with the outside and means for fixing the device to an opening of the tank.

(3) In order to achieve the above object, there is provided a device for detecting leakage of liquid in a tank, which is inserted into the tank to detect the leakage of liquid in the tank, comprising:

a measurement tube passage into which the liquid in the tank is introduced, the measurement tube passage including a measurement tube and a measurement thin tube communicating with the measurement tube and positioned below the measurement tube and having a cross-sectional area smaller than that of the measurement tube;

a sensor for use in measuring a flow rate of the liquid in the measurement thin tube, the sensor being attached to the measurement thin tube;

an open/close valve provided in an upper part of the measurement tube; and leakage detection means for detecting the leakage of the liquid in the tank based on an integrated value of the flow rate measured using the sensor after closing the open/close valve for a predetermined time and subsequently opening the valve.

In an aspect of the present invention, the cross-sectional area of the measurement thin tube is $1/50$ or less, preferably $1/100$ or less, more preferably $1/300$ or less of that of the measurement tube. In an aspect of the present invention, the measurement tube and the measurement thin tube are directed substantially in a vertical direction.

In an aspect of the present invention, the sensor is a thermal flow rate sensor. In an aspect of the present invention, the thermal flow rate sensor includes a flow rate detection section and a temperature detection section, and the leakage detection means obtains the flow rate subjected to temperature compensation by an electric circuit comprising the flow rate detection section and the temperature detection section. In an aspect of the present invention, either of the flow rate detection section and the temperature detection section comprises a heat transfer member which contacts the outer surface of the measurement thin tube. In an aspect of the present invention, the leakage detection means controls opening/closing of the open/close valve.

In an aspect of the present invention, the device further comprises liquid level detection means for use in detecting a height of a surface of the liquid, wherein the leakage detection means corrects an integrated value of the flow rate measured using the sensor based on a liquid level detected by the liquid level detection means and a value of a parameter concerning the shape of the tank to obtain a corrected integrated value, and detects the leakage of the liquid in the tank based on the corrected integrated value. In an aspect of the present invention, the liquid level detection means is a pressure sensor which detects a liquid pressure received from the liquid in the tank. In an aspect of the present invention, the parameter concerning the shape of the tank is a ratio of an effective cross-sectional area of the tank with respect to the cross-sectional area of the measurement tube in an equal height, and the corrected integrated value is obtained by multiplying the integrated value by the value of the parameter in the liquid level.

In an aspect of the present invention, the leakage detection means emits a leakage detection signal, when the integrated value of the flow rate or the corrected integrated value is not less than a predetermined value.

In an aspect of the present invention, the measurement tube passage is formed through a sheath tube and a sensor holder member attached to a lower part of the sheath tube, the sensor holder member holds the sensor, and the measurement thin tube is disposed through the sensor holder member. In an aspect of the present invention, a cap member is attached to an upper part of the sheath tube, the cap member is provided with a communication path for allowing the measurement tube to communicate with the outside and means for fixing the device to an opening of the tank, and the open/close valve is disposed on the communication path.

(4) In order to achieve the above object, there is provided a device for detecting leakage of liquid in a tank, which is inserted into the tank to detect the leakage of liquid in the tank, comprising:

a measurement tube passage into which the liquid in the tank is introduced, the measurement tube passage including a measurement tube and a measurement thin tube communicating with the measurement tube and positioned below the measurement tube and having a cross-sectional area smaller than that of the measurement tube;

a first sensor for use in measuring a flow rate of the liquid in the measurement thin tube, the first sensor being attached to the measurement thin tube;

a second sensor for use in detecting a direction of a flow of the liquid in the measurement thin tube, the second sensor being attached to the measurement thin tube; and leakage detection means for detecting the leakage of the liquid in the tank based on a combination of the direction of the flow of the fluid detected using the second sensor and the flow rate measured using the first sensor.

In an aspect of the present invention, the cross-sectional area of the measurement thin tube is $1/50$ or less, preferably $1/100$ or less, more preferably $1/300$ or less of that of the measurement tube. In an aspect of the present invention, the measurement tube and the measurement thin tube are directed substantially in a vertical direction.

In an aspect of the present invention, the first sensor is a thermal flow rate sensor. In an aspect of the present invention, the thermal flow rate sensor includes a flow rate detection section and a temperature detection section, and the leakage detection means obtains the flow rate subjected to temperature compensation by an electric circuit comprising the flow rate detection section and the temperature detection section. In an aspect of the present invention, either of the flow rate detection section and the temperature detection section comprises a heat transfer member which contacts the outer surface of the measurement thin tube.

In an aspect of the present invention, the second sensor comprises a pair of thermometric sensors disposed above and below the flow rate detection section of the thermal flow rate sensor. In an aspect of the present invention, either of the pair of thermometric sensors comprises a heat transfer member which contacts the outer surface of the measurement thin tube.

In an aspect of the present invention, the leakage detection means emits a leakage detection signal, when the direction of the flow of the liquid detected using the second sensor is a downward direction and the flow rate measured using the first sensor is in a predetermined range. In an aspect of the present invention, the leakage detection means emits the leakage detection signal in a case where the direction of the flow of the liquid detected using the second sensor is a downward direction and a duration of time within which the flow rate measured using the first sensor is in a predetermined range is not less than a predetermined ratio within a predetermined time.

In an aspect of the present invention, the measurement tube passage is formed through a sheath tube and a sensor holder member attached to a lower part of the sheath tube, the sensor holder member holds the first and second sensors, and the measurement thin tube is disposed through the sensor holder member. In an aspect of the present invention, a cap member is attached to an upper part of the sheath tube, and the cap member is provided with a communication path for allowing the measurement tube to communicate with the outside and means for fixing the device to an opening of the tank.

BRIEF DESCRIPTION OF THE DRAWINGS

FIG. 3A is a plan view showing a sensor;

FIG. 3B is a side view showing the sensor;

FIG. 4A is a plan view showing a measurement thin tube and the sensor;

FIG. 4B is a side view showing the measurement thin tube and the sensor;

FIG. 32 is a schematic diagram showing the leakage detection circuit;

FIG. 34 is a schematic diagram of a centralized supply system of petroleum in a large-scaled apartment house;

BEST MODE FOR CARRYING OUT THE INVENTION

Figure 1:
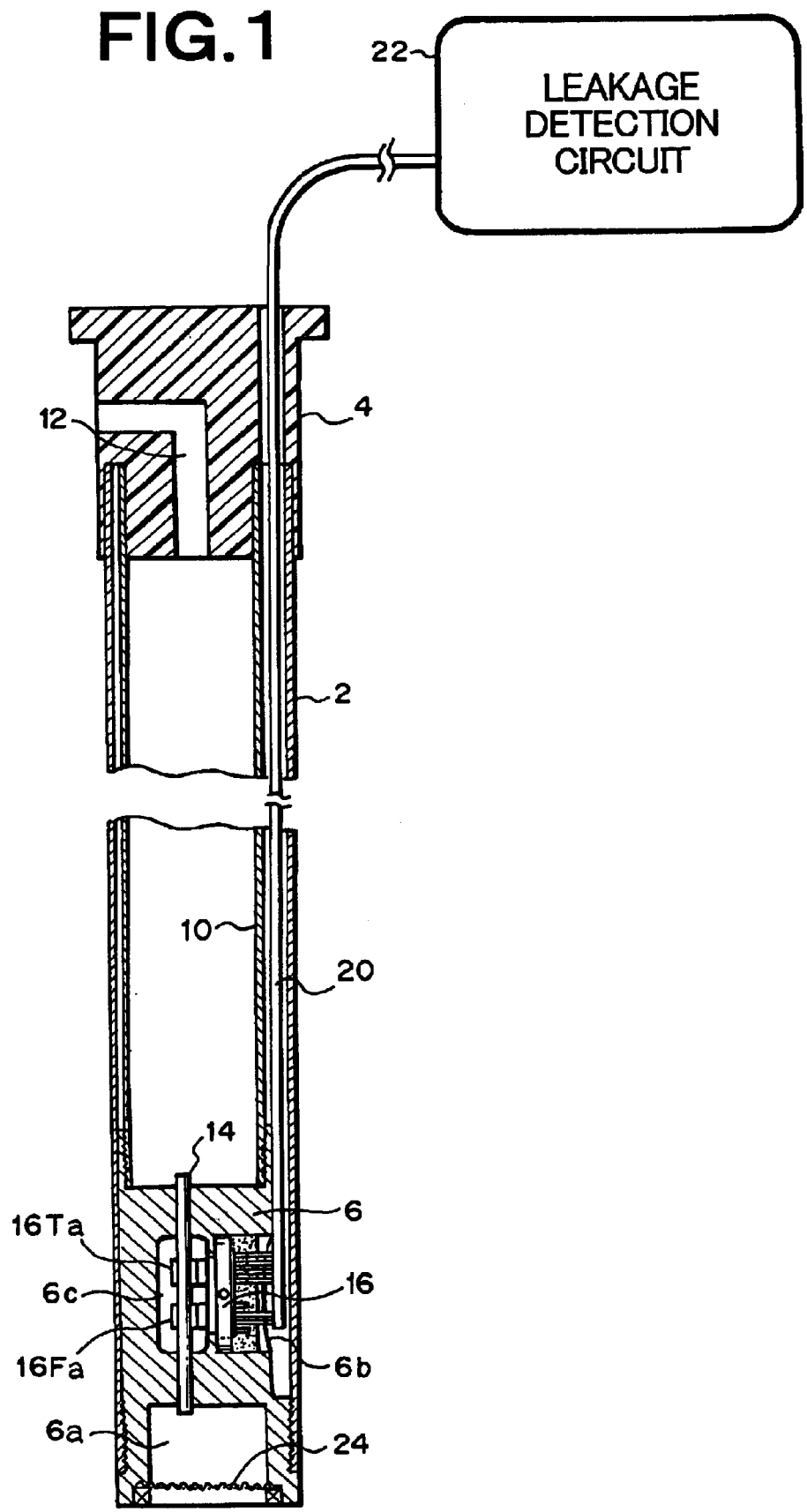
FIG. 1 is a partially omitted sectional view showing a device for detecting leakage of liquid in a tank according to the present invention.

Embodiments of the present invention will be described hereinafter with reference to the drawings. It is to be noted that in the drawings, members, components or the like having the same or similar functions are denoted with the same reference numerals.

Figure 2:
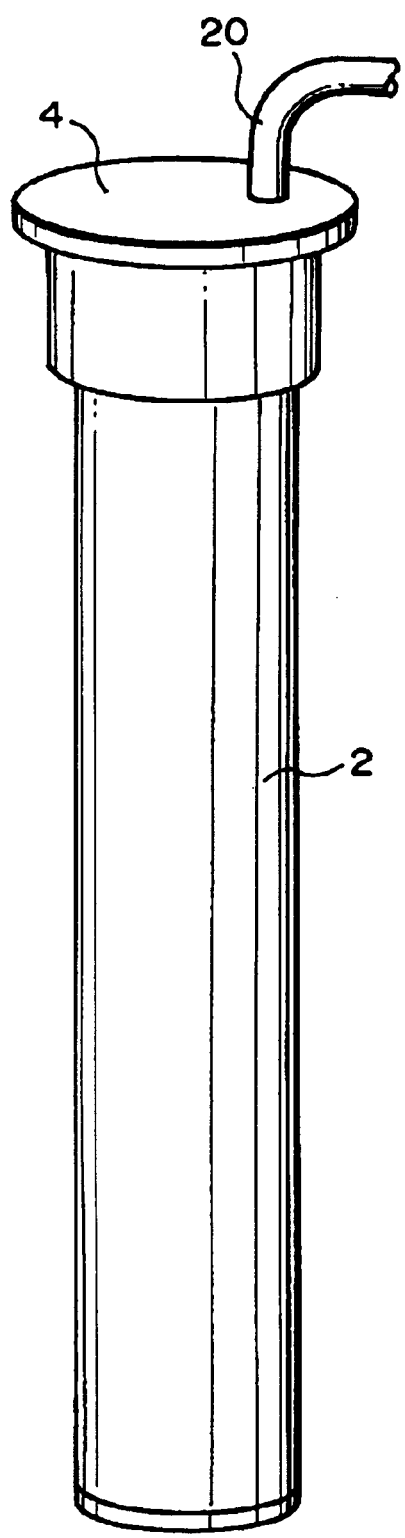
FIG. 2 is a partial perspective view showing the device for detecting the leakage of liquid in the tank according to the present invention.

(1) FIG. 1 is a partially omitted sectional view showing an embodiment of a device for detecting leakage of liquid in a tank according to the present invention, and FIG. 2 is a partial perspective view of the device.

The detection device comprises: a sheath tube 2 having a cylindrical shape and disposed in a vertical direction; a cap member 4 adapted to an upper part of the sheath tube; and a sensor holder member 6 adapted to a lower part of the sheath tube 2. In the sheath tube 2, a measurement tube 10 exists so as to extend between the lower part of the cap member 4 and the upper part of the sensor holder member 6. A communication path 12 is formed in the cap member 4, and the communication path 12 allows the inside of the measurement tube 10 to communicate with the outside of the cap member 4.

A measurement thin tube 14 extending in a vertical direction is disposed in the sensor holder member 6. An upper end of the measurement thin tube 14 opens in the measurement tube 10, and a lower end of the measurement thin tube 14 opens in a concave portion 6a formed in the lower part of the sensor holder member 6. The measurement thin tube 14 and the measurement tube 10 form a measurement tube passage. When the detection device is inserted into the tank from above, liquid in the tank is introduced into the measurement tube passage from a lower end opening of the measurement thin tube 14 to form the liquid surface in the measurement tube 10. A cross-sectional area of the measurement thin tube 14 is smaller than that of the measurement tube 10, for example, $\frac{1}{50}$ or less, preferably $\frac{1}{100}$ or less, more preferably $\frac{1}{300}$ or less of the cross-sectional area of the measurement tube 10. When the cross-sectional area of the measurement thin tube 14 is sufficiently reduced as compared with that of the measurement tube 10 in this manner, a flow velocity of liquid in the measurement thin tube 14 is made remarkably high with a height fluctuation of the liquid surface.

In the sensor holder member 6, a sensor 16 for detecting leakage is disposed in a sensor housing concave portion 6b. The sensor 16 is used for measuring a flow rate of the liquid in the measurement thin tube 14 for detecting the leakage, and connected to a leakage detection circuit 22 via a sensor wiring 20. As shown in the drawings, the wiring 20 extends through a space inside the sheath tube 2 and outside the measurement tube 10 and through a through hole formed in the cap member 4 in the vertical direction. A lower end portion of the sensor holder member 6 is provided with a filter mesh 24 to cover the concave portion 6a.

FIGS. 3A and 3B are diagrams showing the sensor 16 and, in particular, FIG. 3A is a front view and FIG. 3B is a side view. The sensor 16 is a thermal flow rate sensor of an indirectly heated type, and includes a flow rate detection section 16F and a temperature detection section 16T. They are integrated by a common resin housing 16H. The flow rate detection section 16F and temperature detection section 16T include heat transfer members 16Fa, 16Ta for heat exchange with liquid and electrode terminals 16Fb, 16Tb. FIGS. 4A and 4B are diagrams showing the measurement thin tube 14 and sensor 16 and, in particular, FIG. 4A is a front view and FIG. 4B is a side view. The heat transfer members 16Fa, 16Ta of the flow rate and temperature detection sections both contact the outer surface of the measurement thin tube 14, and this makes possible the heat exchange between the flow rate detection section 16F and temperature detection section 16T and the liquid in the measurement thin tube 14. As shown in FIG. 1, the heat transfer members 16Fa, 16Ta of the sensor 16 contact the measurement thin tube 14 in a detection cavity 6c formed in the sensor holder member 6.

Figure 5:
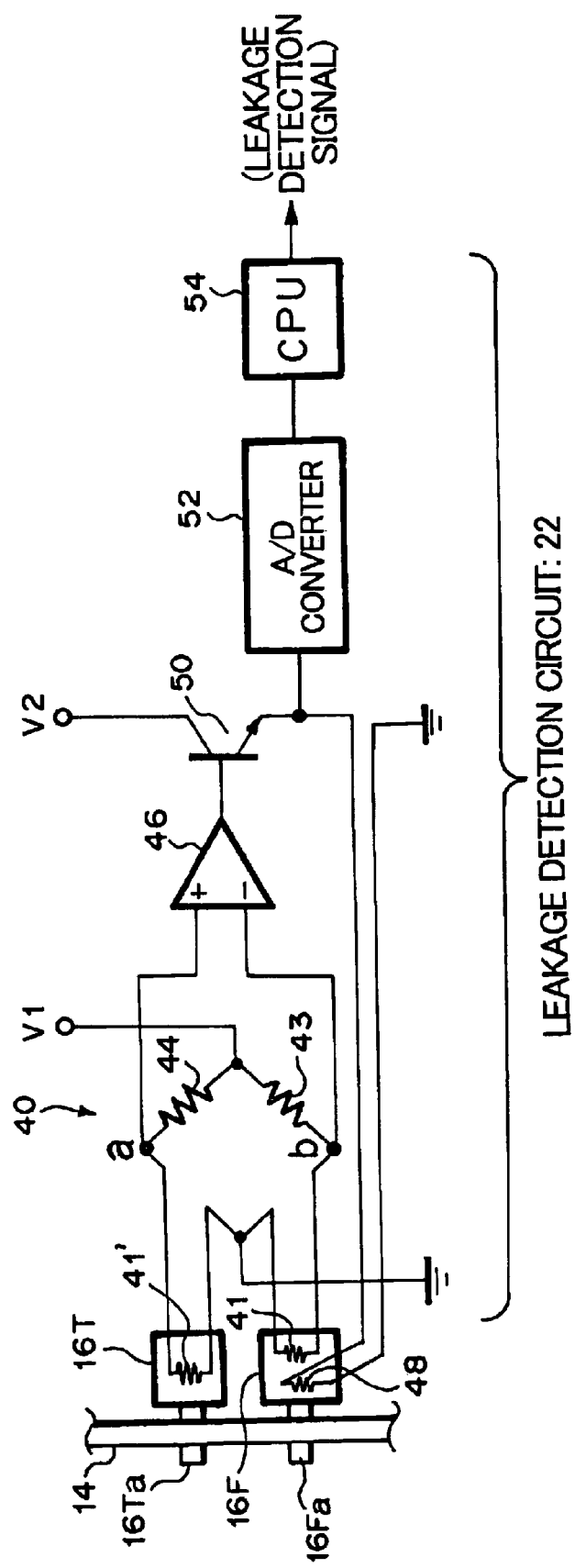
FIG. 5 is a schematic diagram showing a leakage detection circuit.

FIG. 5 is a schematic diagram showing the leakage detection circuit 22 constituting leakage detection means including a circuit for measuring the flow rate using the sensor 16. The circuit for measuring the flow rate is similar to a circuit of a thermal flowmeter of the indirectly heated type described, for example, in JP-A-11-118566, and outputs an electric signal in accordance with an instantaneous flow rate of liquid circulated in the measurement thin tube 14. By appropriate integration, the electric signal can be output in accordance with an integrated flow rate.

In the flow rate detection section 16F, a thin-film heating resistor 48 and a thin-film thermo-sensing resistor 41 are disposed in such a manner that heat exchange is possible with respect to the heat transfer member 16Fa. In the temperature detection section 16T, a thin-film thermo-sensing resistor 41' is disposed in such a manner that the heat exchange is possible with respect to the heat transfer member 16Ta.

A direct-current voltage V1 is supplied to a bridge circuit (detection circuit) 40. The bridge circuit 40 includes the thin-film thermo-sensing resistor 41 of the flow rate detection section 16F, the thin-film thermo-sensing resistor 41' of the temperature detection section 16T, and resistors 43, 44. Potentials Va, Vb of points a, b of the bridge circuit 40 are input into a differential amplification/integration circuit 46.

On the other hand, a direct-current voltage V2 is supplied to the thin-film heating resistor 48 via a transistor 50 for controlling a current supplied to the thin-film heating resistor 48 of the flow rate detection section 16F. That is, the flow rate detection section 16F is endothermically influenced by the liquid in the measurement thin tube 14 via the heat transfer member 16Fa based on the heating of the thin-film heating resistor 48 to execute temperature detection by the thin-film thermo-sensing resistor 41. As a result of the temperature detection, a difference between the potentials Va, Vb of the points a, b of the bridge circuit 40 is obtained.

A value of (Va−Vb) changes, when the temperature of the thin-film thermo-sensing resistor 41 changes in accordance with the flow rate of the liquid. When resistance values of the resistors 43, 44 of the bridge circuit 40 are appropriately set beforehand, the value of (Va−Vb) can be set to zero in a desired liquid flow rate which is a standard flow rate. In this standard flow rate, an output of the differential amplification/integration circuit 46 is constant (value corresponding to the standard flow rate), and the resistance value of the transistor 50 is also constant. In this case, a divided voltage applied to the thin-film heating resistor 48 is also constant, and the voltage of point P indicates the standard flow rate.

When the liquid flow rate increases/decreases, polarity (depending on positive/negative resistance-temperature characteristics of the thin-film thermo-sensing resistor 41) and magnitude of the output of the differential amplification/integration circuit 46 change in accordance with the value of (Va−Vb), and the output of the differential amplification/integration circuit 46 accordingly changes.

When the liquid flow rate increases, the temperature of the thermo-sensing resistor 41 drops. Therefore, the differential amplification/integration circuit 46 controls an input with respect to a base of the transistor 50 so as to decrease the resistance value of the transistor 50, so that a heating amount of the thin-film heating resistor 48 is increased (i.e., power is increased).

On the other hand, when the liquid flow rate decreases, the temperature of the thermo-sensing resistor 41 rises. Therefore, the differential amplification/integration circuit 46 controls the input with respect to the base of the transistor 50 so as to increase the resistance value of the transistor 50, so that the heating amount of the thin-film heating resistor 48 is decreased (i.e., power is decreased).

As described above, the heating of the thin-film heating resistor 48 is feedback-controlled in such a manner that the temperature detected by the thermo-sensing resistor 41 constantly indicates a target value regardless of the change of the liquid flow rate. In this case, since the voltage (voltage of the point P) applied to the thin-film heating resistor 48 corresponds to the liquid flow rate, the voltage is taken out as a flow rate output. If necessary, the flow rate output may be A/D converted by an A/D converter 52 to be converted to a digital signal. The digital signal corresponding to the flow rate value is input into a CPU 54, and the CPU 54 detects leakage as described later to output a leakage detection signal.

It is to be noted that the temperature detection section 16T is used for obtaining a flow rate value compensated concerning the liquid temperature.

Figure 6:
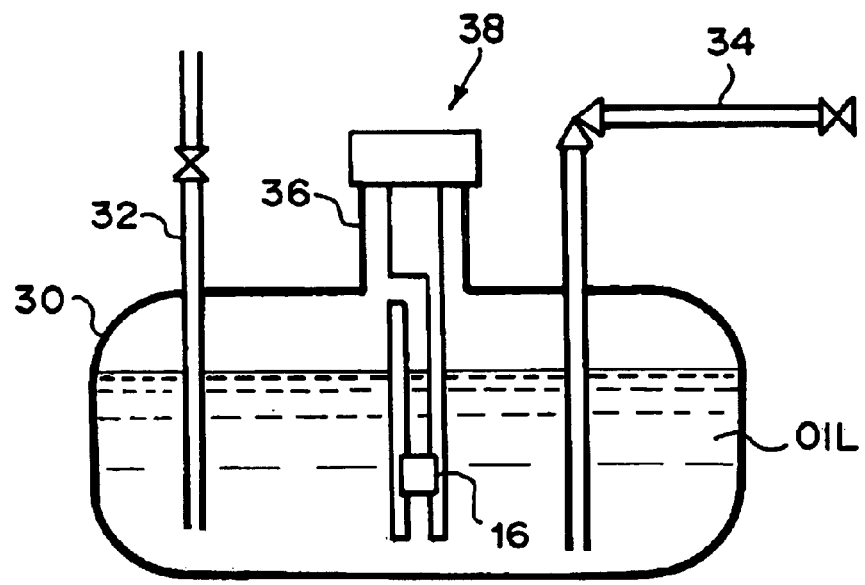
FIG. 6 is a schematic sectional view showing a state in which the device for detecting the leakage of liquid in the tank according to the present invention is attached to the tank.
Figure 7:
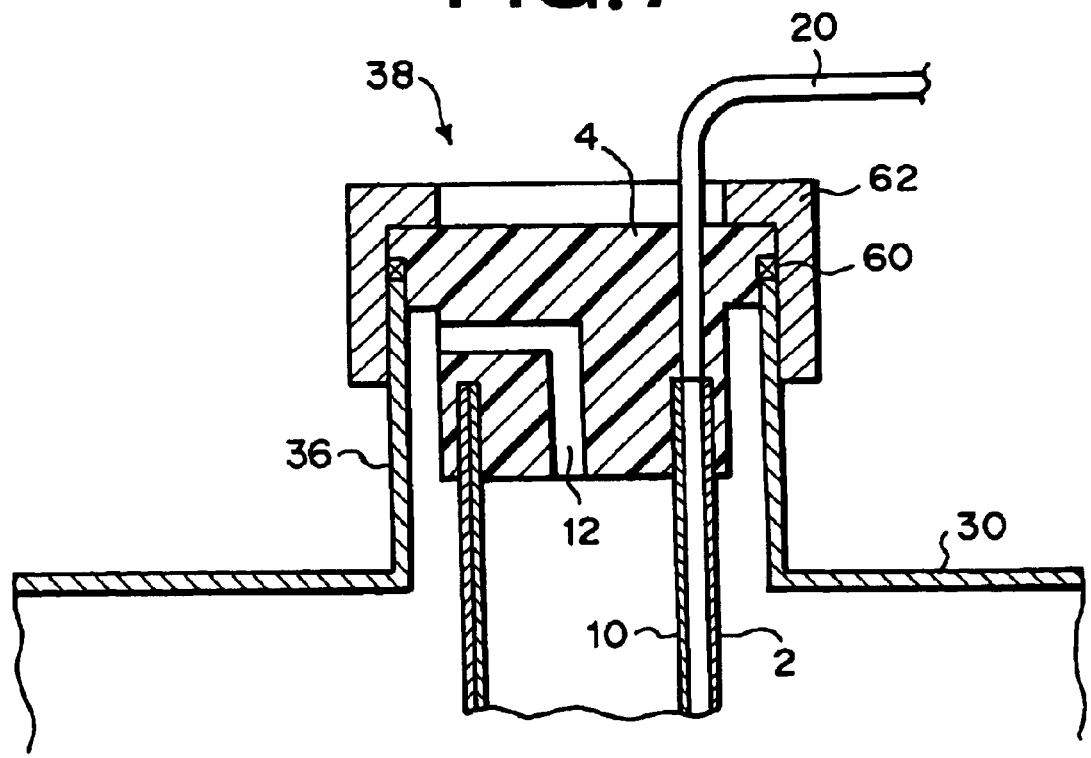
FIG. 7 is an enlarged sectional view showing a fixing portion of the device for detecting the leakage of liquid in the tank according to the present invention to the tank.

FIG. 6 is a schematic sectional view showing a state in which the device for detecting the leakage of the present embodiment is attached to the tank, and FIG. 7 is an enlarged sectional view showing a fixing portion of the leakage detection device to the tank.

In FIG. 6, petroleum OIL is stored as the liquid in a tank 30. The tank 30 is connected to an oil intake tube 32 for use in replenishing the petroleum OIL from the outside and an oil supply tube 34 for use in pumping out the petroleum OIL when selling it to a consumer. Furthermore, the tank 30 is provided with a metering port 36 as an opening for inserting a meter into the tank 30. The metering port 36 is a circular opening having a diameter, for example, of about 30 mm, and is usually closed by a lid. This lid is removed, an outer peripheral edge portion of the cap member 4 is disposed on an upper end portion of the metering port via a packing 60, and a cap nut 62 is fitted to the metering port 32 to fix a leakage detection device 38 to the tank 30. As shown in FIG. 6, the liquid surface or liquid level of the petroleum OIL in the tank 30 is positioned above the sensor 16 and below the cap member 4, and accordingly the liquid surface or liquid level in the detection device 38 is positioned in the measurement tube 10 shown in FIG. 7.

Next, a leakage detection operation in the leakage detection device of the present embodiment will be described.

Figure 8A:
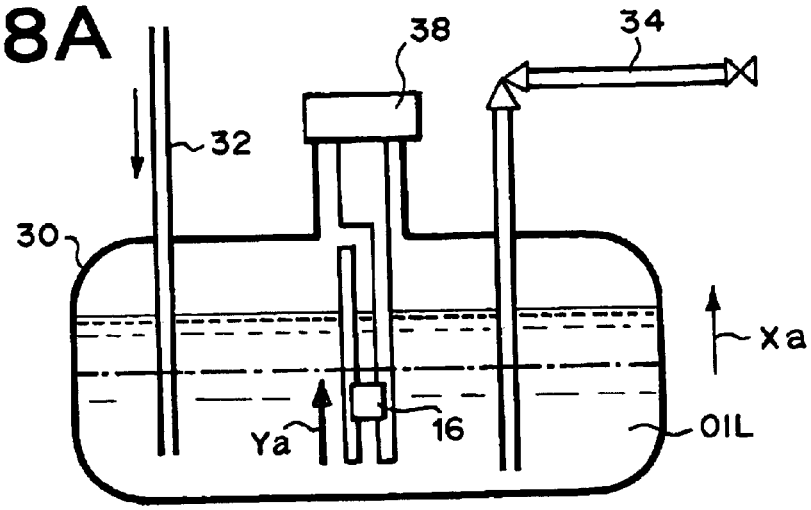
FIGS. 8A to 8C are schematic diagrams showing a pattern of a liquid level fluctuation in the tank.
Figure 8B:
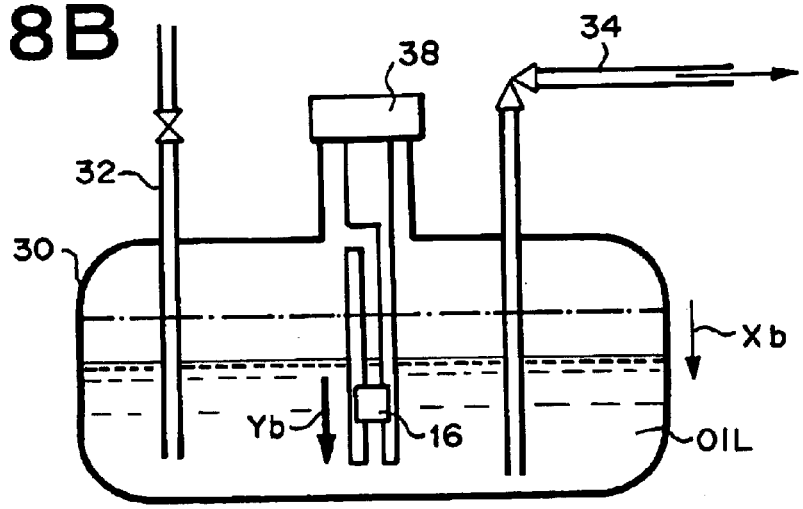
Figure 8C:
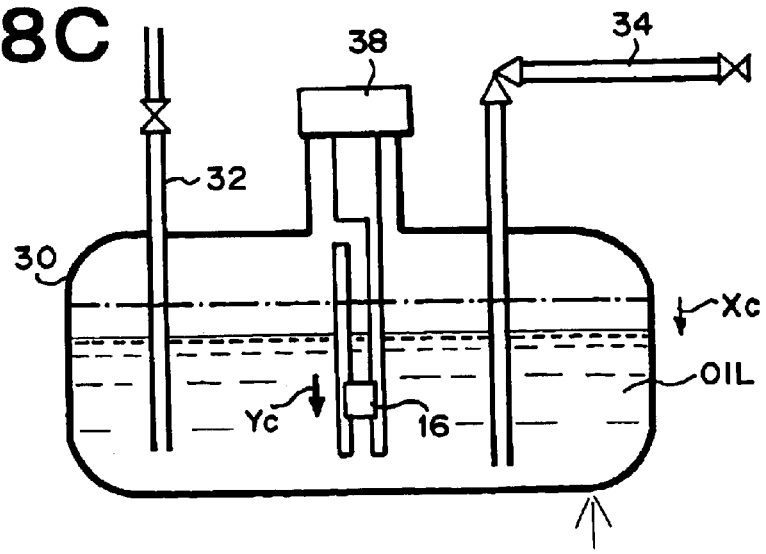

FIGS. 8A to 8C are schematic diagrams showing a pattern of a liquid surface fluctuation or liquid level fluctuation in the tank. FIG. 8A shows that the petroleum OIL is replenished into the tank 30 via the oil intake tube 32. At this time, a liquid level in the tank 30 rapidly rises as shown by an arrow Xa. Therefore, the liquid level in the measurement tube of the detection device 38 rapidly rises, and accordingly a large flow rate value is detected based on an upward flow shown by an arrow Ya in a flow rate measurement circuit using the sensor 16. It is to be noted that when oil leakage from the tank 30 occurs, a slightly smaller flow rate value is detected. FIG. 8B shows that the petroleum OIL is pumped out from the tank 30 via the oil supply tube 34. At this time, a height (level) of the liquid surface in the tank 30 rapidly drops as shown by an arrow Xb. Therefore, the liquid level in the measurement tube of the detection device 38 also rapidly drops, and accordingly a large flow rate is detected based on a downward flow shown by an arrow Yb in the flow rate measurement circuit using the sensor 16. It is to be noted that when the oil leakage from the tank 30 occurs, a slightly larger flow rate value is detected. FIG. 8C shows that neither the replenishment of the petroleum OIL into the tank 30 via the oil intake tube 32 nor the pumping-out of the petroleum OIL from the tank via the oil supply tube 34 is performed and that the oil leakage from the tank 30 occurs. At this time, the liquid level in the tank 30 gradually drops. Therefore, the liquid level in the measurement tube of the detection device 38 gradually drops as shown by an arrow Xc, and accordingly a small flow rate is detected based on the downward flow shown by an arrow Yc in the flow rate measurement circuit using the sensor 16.

Figure 9:
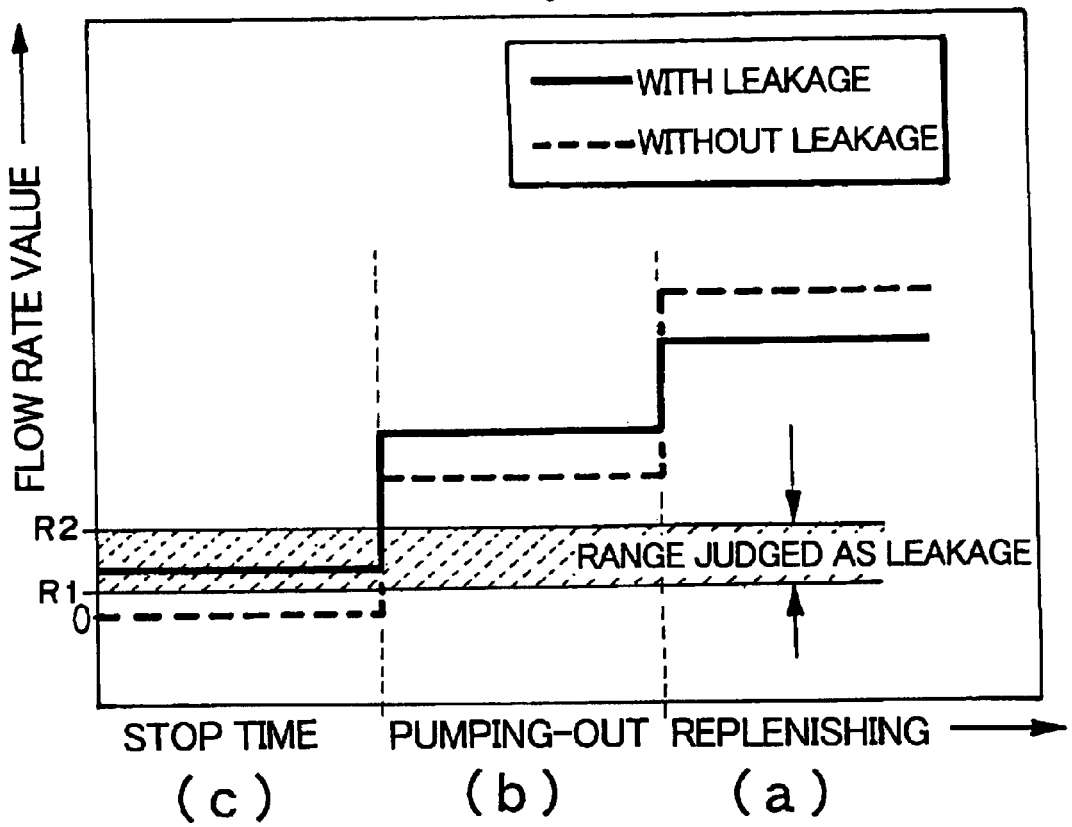
FIG. 9 is a diagram showing comparison of flow rate values in the patterns of the liquid level fluctuation in the tank.

FIG. 9 shows comparison of flow rate values in the patterns of the liquid level fluctuation described above. In FIG. 9, (c) "stop time" indicates a time at which neither the replenishment of the petroleum OIL into the tank 30 via the oil intake tube 32 nor the pumping-out of the petroleum OIL from the tank via the oil supply tube 34 is performed. In FIG. 9, (a), (b), and (c) correspond to FIGS. 8A, 8B, and 8C, respectively. The flow rate values of replenishing (a) and pumping-out (b) can be known beforehand. In these cases, an absolute value is sufficiently greater than that of the flow rate in a case where there is leakage at the stop time (c). Therefore, such flow rate values are avoided and, as shown in the drawings, when the flow rate value is in a range between a lower limit value R1 greater than 0 and an upper limit value R2 smaller than the flow rate value at either time (a) or (b), it is judged that there is leakage.

That is, the CPU 54 shown in FIG. 5 performs the following processes in accordance with a magnitude of the flow rate value input from the A/D converter 52:

(i) judges that there is not any leakage in a case where the flow rate value is less than R1;

(ii) judges the replenishing or the pumping-out in a case where the flow rate value exceeds R2; and (iii) judges that there is leakage to emit the leakage detection signal in a case where the flow rate value is R1 or more and R2 or less. The reason why it is judged that there is not any leakage in a case where the flow rate value is less than R1 is that a measurement error in the flow rate measurement is considered. If the measurement error can be reduced, R1 can be reduced.

Figure 10:
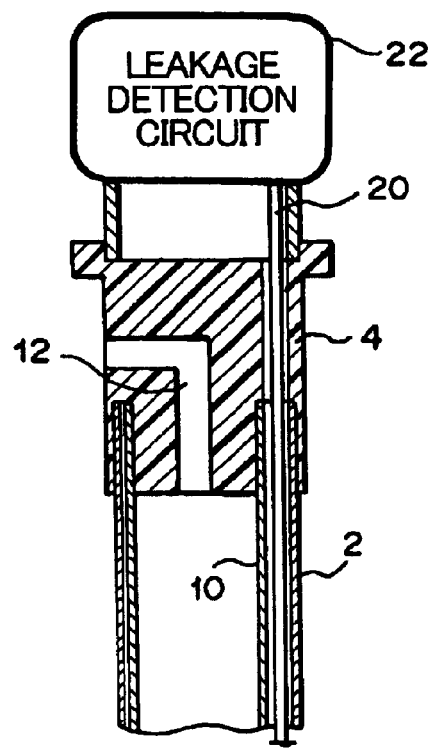
FIG. 10 is a partial sectional view showing the device for detecting the leakage of liquid in the tank according to the present invention.

FIG. 10 is a partial sectional view showing another embodiment of the device for detecting the leakage of liquid in the tank according to the present invention. In this embodiment, the leakage detection circuit 22 is housed in the member integrated with the cap member 4. This sets the device to be compact. The constitution and function of the leakage detection circuit 22 are similar to those of the above-described embodiment.

Figure 11:
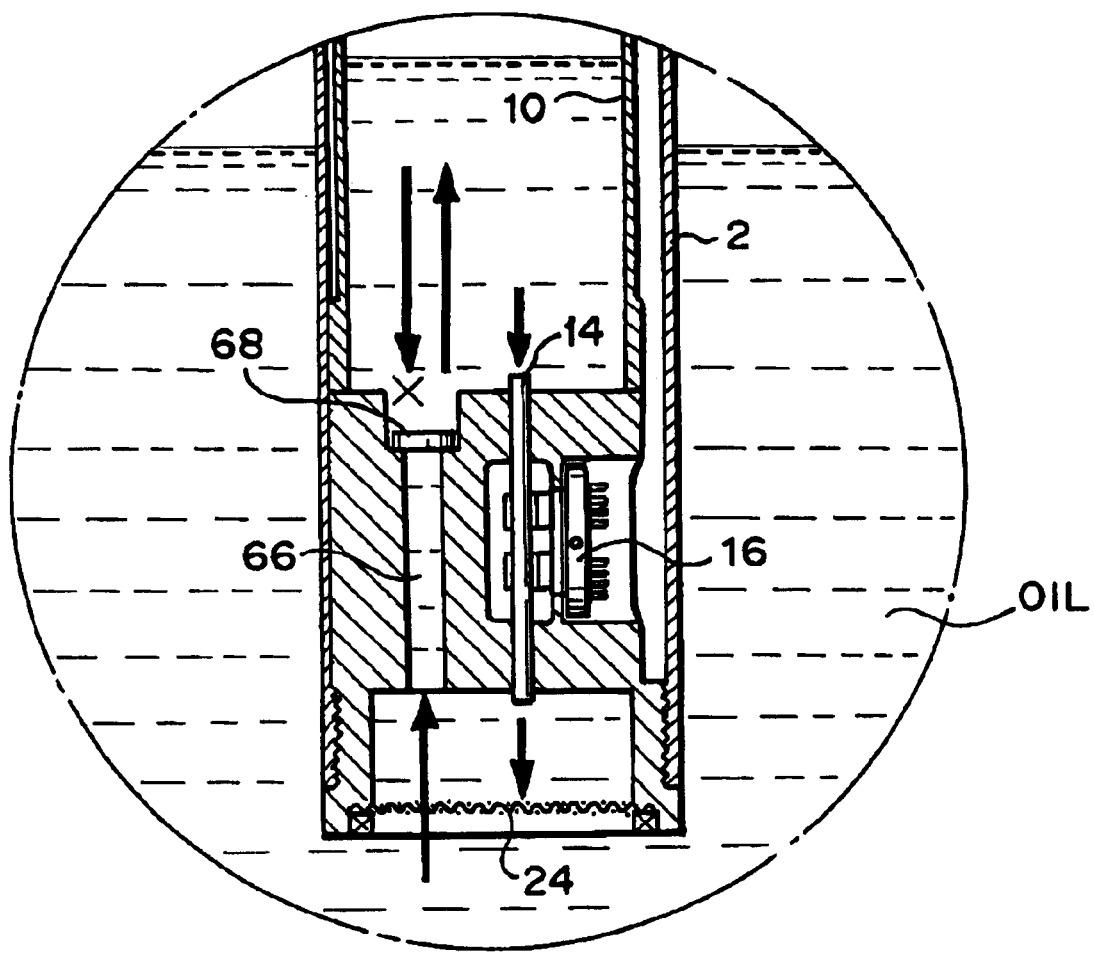
FIG. 11 is a partial sectional view showing the device for detecting the leakage of liquid in the tank according to the present invention.

Moreover, FIG. 11 is a partial sectional view showing still another embodiment of the device for detecting the leakage of liquid in the tank according to the present invention. In this embodiment, in the sensor holder member 6, a bypass 66 of a vertical direction for allowing the measurement tube 10 to communicate with the concave portion 6a is disposed separately from the measurement thin tube 14. A check valve 68 is attached to the bypass 66, and the check valve 68 inhibits the petroleum OIL in the bypass 66 from being circulated downwards. When the leakage detection device is inserted into the tank, the petroleum OIL is not quickly introduced into the measurement tube 10 only via the measurement thin tube 14, and therefore much time is required until a leakage detection operation starts. However, when the bypass 66 is attached, the leakage detection operation can be started immediately after inserting the leakage detection device into the tank. A cross-sectional area of the bypass 66 is sufficiently larger than that of the measurement thin tube 14 so that this function can be fulfilled.

Figure 12:
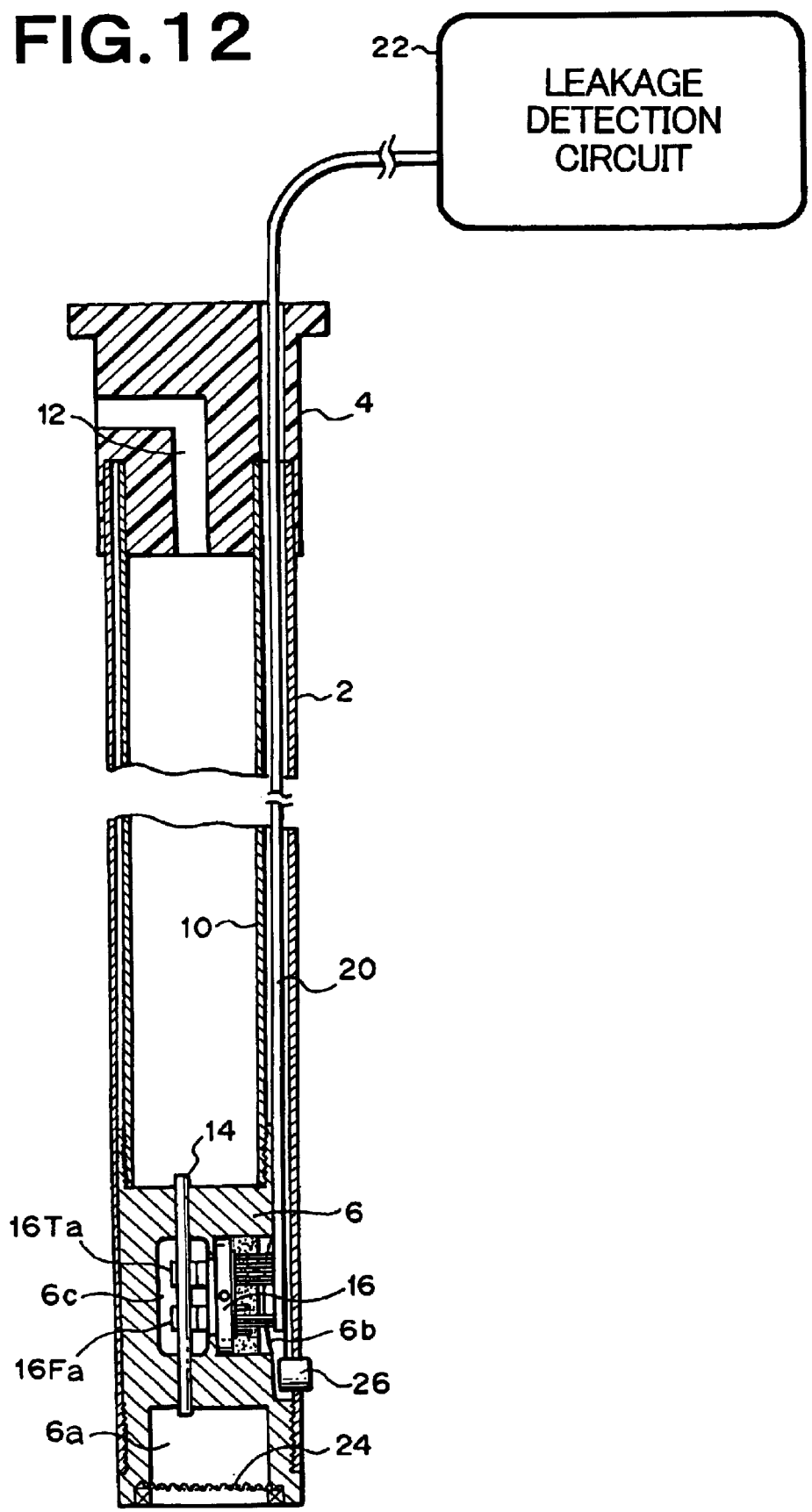
FIG. 12 is a partially omitted sectional view showing the device for detecting the leakage of liquid in the tank according to the present invention.
Figure 13:
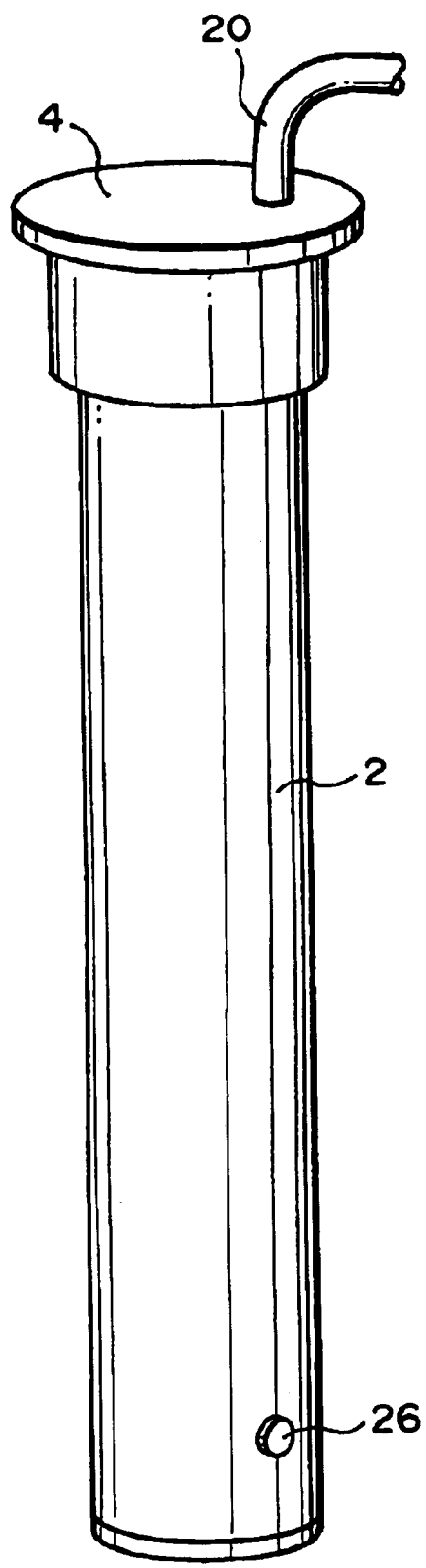
FIG. 13 is a partial perspective view showing the device for detecting the leakage of liquid in the tank according to the present invention.

(2) FIG. 12 is a partially omitted sectional view showing an embodiment of the device for detecting the leakage of liquid in the tank according to the present invention, and FIG. 13 is a partial perspective view of the device. The present embodiment is different from the embodiment described with reference to FIGS. 1 to 8C in the following respects, but is the same in the other respects.

That is, as shown in FIG. 12, a pressure sensor 26 for detecting a liquid pressure received from the liquid in the tank is disposed as liquid surface height detection means or liquid level detection means for use in detecting the height of the liquid surface of the liquid or the liquid level is disposed in the sensor housing concave portion 6b. The pressure sensor 26 protrudes to the outside of the sheath tube 2 through an opening disposed in the sheath tube 2. Accordingly, when the detection device is inserted into the tank, a pressure receiving surface portion undergoes the liquid pressure from the liquid in the tank outside the sheath tube. The pressure sensor 26 is connected to the leakage detection circuit 22 via a wiring extending in a path similar to that of the sensor 16.

The measurement thin tube 14 and sensor 16 of the device of the present embodiment are similar to those of FIGS. 3A and 3B and 4A and 4B.

Figure 14:
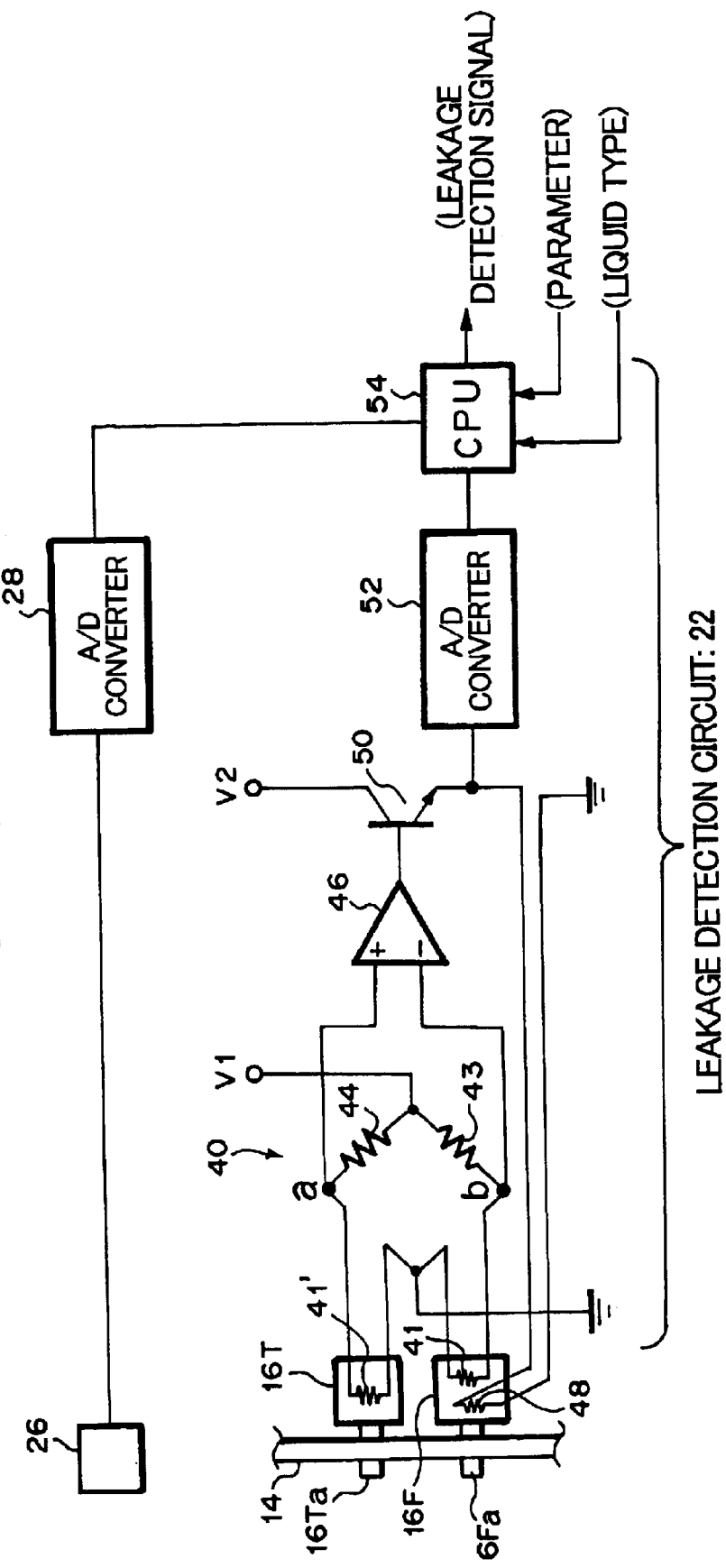
FIG. 14 is a schematic diagram showing the leakage detection circuit.

FIG. 14 is a schematic diagram showing the leakage detection circuit 22 constituting the leakage detection means including the circuit for measuring the flow rate using the sensor 16 and detecting the leakage by using an output of the pressure sensor 26. The circuit for the flow rate measurement is similar to the circuit of the thermal flowmeter of the indirectly heated type described, for example, in JP-A-11-118566, and outputs the electric signal in accordance with the instantaneous flow rate of the liquid circulated in the measurement thin tube 14. By appropriate integration, the electric signal can be output in accordance with the integrated flow rate. The leakage detection circuit 22 is different from that shown in FIG. 5 in the following respects, but is the same in the other respects.

If necessary, the output (output corresponding to the liquid surface height value or the liquid level value) of the pressure sensor 26 may be A/D converted by an A/D converter 28 to be converted to a digital signal. A digital output signal corresponding to the liquid surface height value is input into the CPU 54. The value of a parameter concerning the shape of the tank is input into the CPU 54 by input means (not shown). This parameter will be described later. A type (especially a specific gravity value) of liquid in the tank is input into the CPU 54 by input means (not shown).

The CPU 54 detects the leakage as described later to output the leakage detection signal. It is to be noted that the temperature detection section 16T is used to obtain the flow rate value compensated concerning the liquid temperature.

Figure 15:
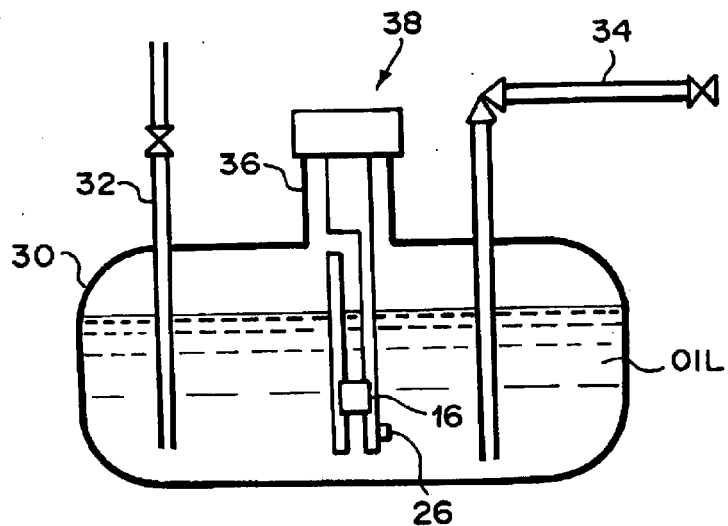
FIG. 15 is a schematic sectional view showing the state in which the device for detecting the leakage of liquid in the tank according to the present invention is attached to the tank.

FIG. 15 is a schematic sectional view showing the state in which the leakage detection device of the present embodiment is attached to the tank, and this state is similar to FIG. 6. The fixing portion of the device of the present embodiment onto the tank is similar to that of FIG. 7.

Next, the leakage detection operation in the leakage detection device of the present embodiment will be described.

The pattern of the liquid level fluctuation in the tank has been described with reference to FIGS. 8A to 8C.

Figure 16:
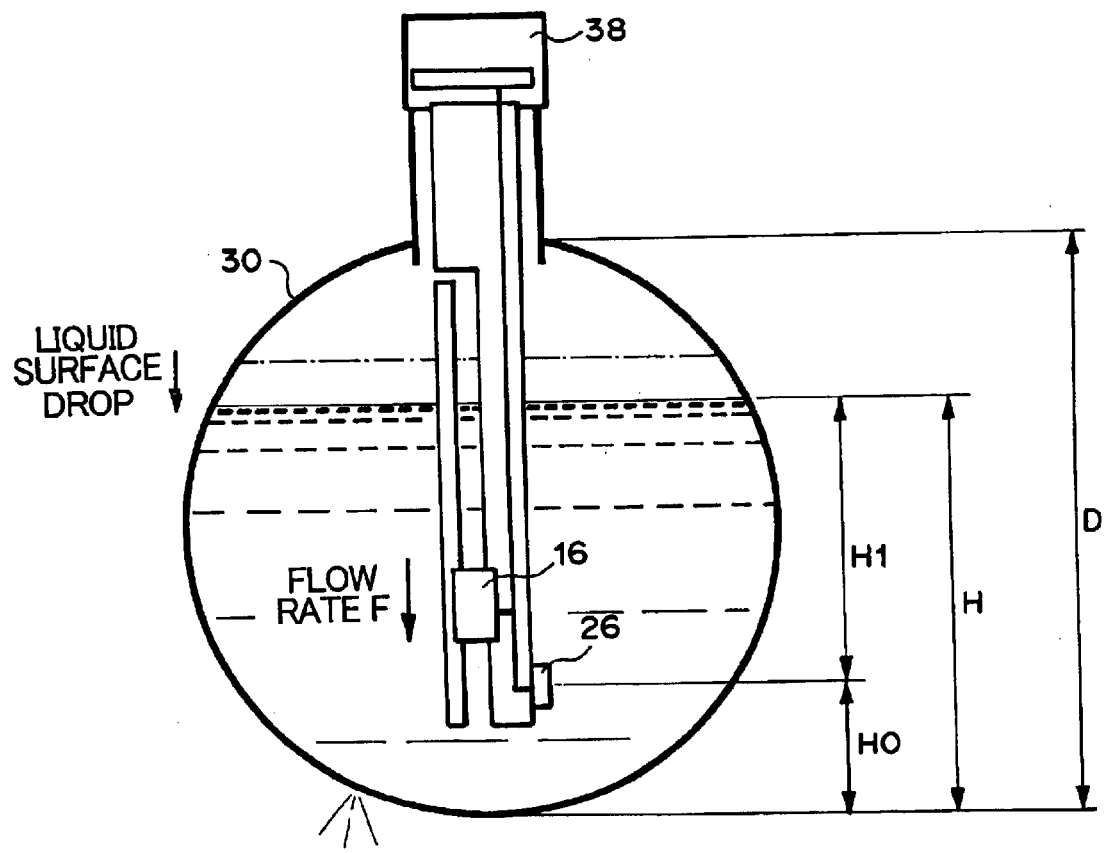
FIG. 16 is a schematic sectional view showing leakage detection by the device for detecting the leakage of liquid in the tank according to the present invention.

Additionally, the shape of the tank 30 does not necessarily have a uniform transverse area (horizontal cross-sectional area) with respect to the vertical direction. That is, as shown in FIG. 16, in a cylindrical tank whose vertical sectional shape is circular, the lower or upper height portion of the tank is small in transverse cross-sectional area as compared with the intermediate height portion of the tank. On the other hand, the measurement tube 10 of the detection device has a uniform transverse area (horizontal cross-sectional area) with respect to the vertical direction. Therefore, even when the flow rate of the petroleum OIL flowing in the measurement thin tube 14 with the fluctuation of the liquid level in the measurement tube 10 is constant (i.e., a fluctuation amount of the liquid level is constant), but when the liquid level is in the lower or upper height portion of the tank, the fluctuation of the petroleum amount in the whole tank is small as compared with a case where the liquid level is in the intermediate height portion. Therefore, even when the equal flow rate is detected, the amount of the leakage of the petroleum differs with the height of the liquid level in the tank.

In the present embodiment, to solve the technical problem based on the leakage amount which is not proportional to the detected flow rate with the liquid level, the pressure sensor 26 detects a liquid level H, the detected flow rate value is corrected based on this liquid level to obtain a corrected flow rate value, and the leakage is detected based on the magnitude of the corrected flow rate value.

The parameter to be input into the CPU 54 may be, for example, a ratio of an effective cross-sectional area (horizontal cross-sectional area obtained by removing the horizontal cross-sectional area of the measurement tube 10 [the cross-sectional area of the internal space of the measurement tube 10 is not removed]) of an internal space of the tank with respect to the cross-sectional area (horizontal cross-sectional area) of the inner space of the measurement tube 10 in the equal height. Such a parameter can be prepared beforehand based on the shapes of the tank 30 and the measurement tube 10 of the detection device 38 attached to the tank.

Figure 17:
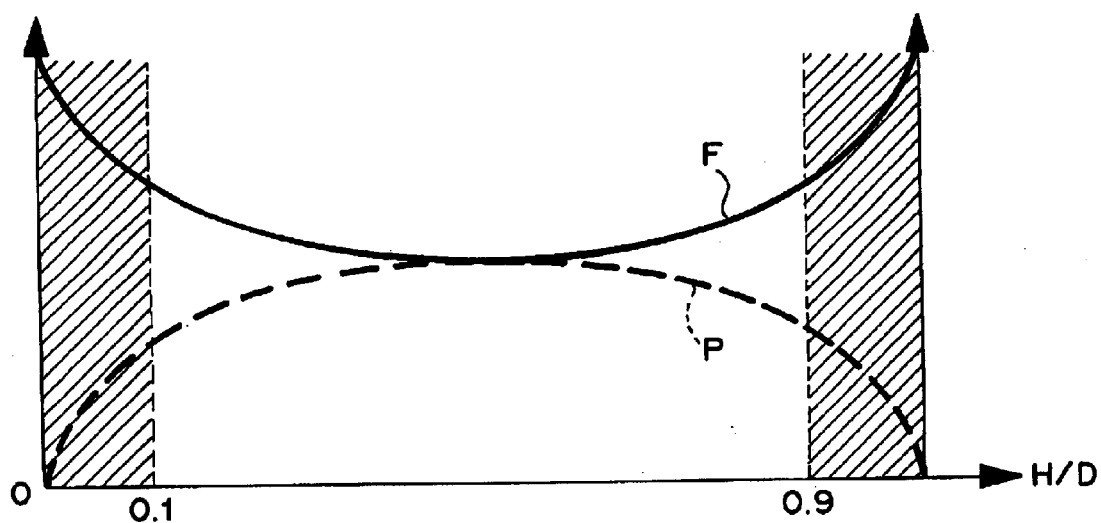
FIG. 17 is a diagram schematically showing a magnitude relation between a parameter value and a flow rate output value in the tank shown in FIG. 16.

FIG. 17 schematically shows a magnitude relation between the value of a parameter P and that of a flow rate output F with respect to a value of H/D, assuming that a diameter of the tank 30 is D, and the liquid level height from a lowest portion of the tank 30 is H. Usually, in the liquid surface level, H/D is in a region of 0.1 or more and 0.9 or less. As shown in FIG. 16, the pressure sensor 26 is disposed at a position of height H0 from the lowest portion of the tank 30 (H0 is known, and H0/D is set to 0.1 or less), and the liquid surface level height corresponds to a height Hi from the pressure sensor 26. Therefore, when the pressure sensor 26 detects the liquid surface height corresponding to H1, the liquid surface level height H from the lowest portion of the tank 30 can be detected.

It is to be noted that in addition to the above-described parameter, examples of the parameter concerning the shape of the tank include an inner diameter D and a length L of the tank (dimension in a direction vertical to the sheet surface of FIG. 16: i.e., a transverse direction in FIGS. 8A to 8C). In this case, the above-described ratio is obtained by calculation in the CPU 54.

Moreover, when the type or specific gravity of the liquid in the tank 30 is input, the height of the liquid level detected using the pressure sensor 26 can be calibrated in the CPU 54.

The CPU calculates the corrected flow rate based on the flow rate input from the flow rate measurement circuit and a value corresponding to the liquid surface level height input from the pressure sensor 26. The corrected flow rate may be obtained by multiplying the parameter value (the above-described ratio) corresponding to the liquid surface level height H obtained based on the input value from the pressure sensor 26 by the flow rate value.

Figure 18:
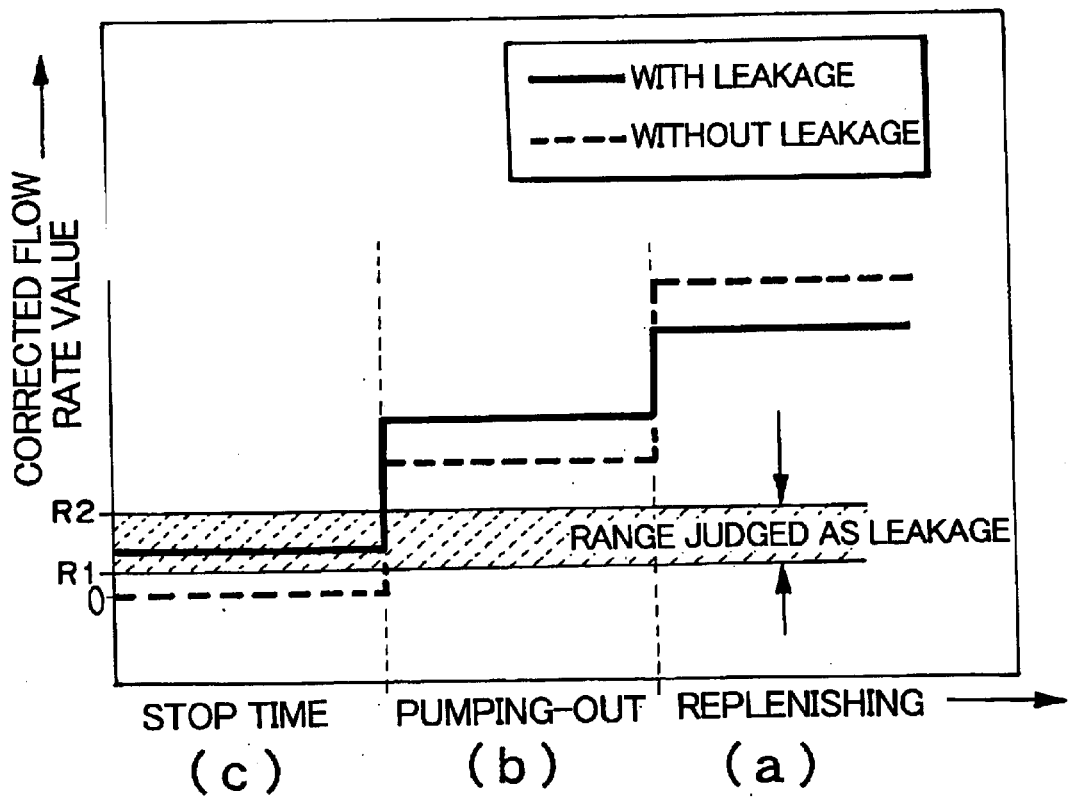
FIG. 18 is a diagram showing comparison of corrected flow rate values in the respective patterns of the liquid level fluctuation in the tank.

FIG. 18 shows comparison of the corrected flow rates in the respective patterns of the liquid surface level fluctuation shown in FIGS. 8A to 8C. In FIG. 18, (c) "stop time" indicates a time at which neither the replenishment of the petroleum OIL into the tank 30 via the oil intake tube 32 nor the pumping-out of the petroleum OIL from the tank 30 via the oil supply tube 34 is performed. In FIG. 18, (a), (b), and (c) correspond to FIGS. 8A, 8B, and 8C, respectively. The corrected flow rates of the replenishing (a) and the pumping-out (b) can be known beforehand. In these cases, the absolute value is sufficiently greater than that of the corrected flow rate in a case where there is leakage at the stop time (c). Therefore, such corrected flow rate values are avoided and, as shown in the drawings, when the corrected flow rate value is in a range between a lower limit value R1 greater than 0 and an upper limit value R2 smaller than the corrected flow rate value at either time (a) or (b), it is judged that there is leakage.

That is, the CPU 54 shown in FIG. 14 performs the following processes in accordance with the magnitudes of the corrected flow rate obtained based on the flow rate value and value corresponding to the liquid surface level height input from the A/D converters 52, 28:

(i) judges that there is not any leakage in a case where the corrected flow rate value is less than R1;

(ii) judges the replenishing or the pumping-out in a case where the corrected flow rate value exceeds R2; and (iii) judges that there is leakage to emit the leakage detection signal in a case where the corrected flow rate value is R1 or more and R2 or less.

The reason why it is judged that there is not any leakage in a case where the corrected flow rate is less than R1 is that the measurement error in the corrected flow rate measurement is considered. If the measurement error can be reduced, R1 can be reduced.

As a modification of the present embodiment, as in the embodiment described with reference to FIG. 10, the leakage detection circuit 22 is housed in the member integrated with the cap member 4.

Figure 19:
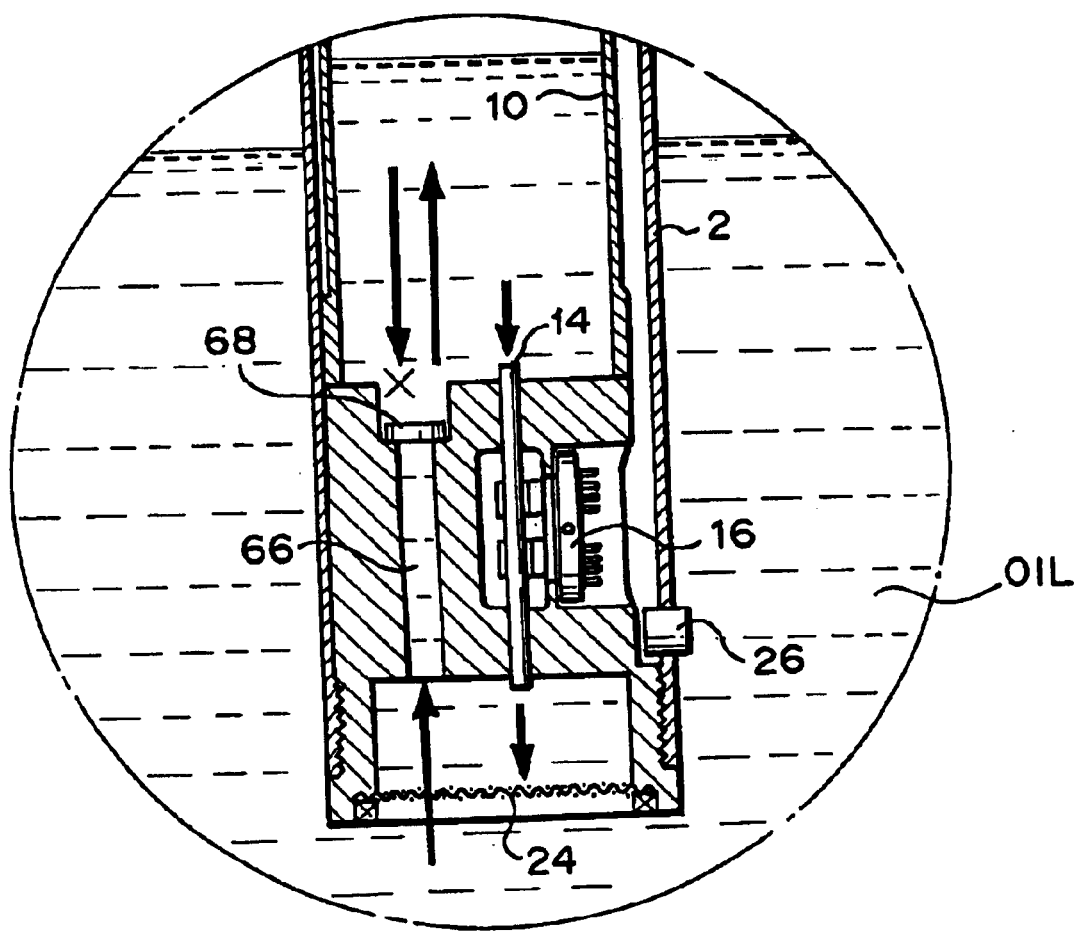
FIG. 19 is a partial sectional view showing the device for detecting the leakage of liquid in the tank according to the present invention.

Moreover, FIG. 19 is a partial sectional view showing still another embodiment of the device for detecting the leakage of liquid in the tank according to the present invention. In this embodiment, a structure described with reference to FIG. 11 is disposed.

In the above-described embodiment, the pressure sensor which detects the liquid pressure received from the liquid in the tank is used as the liquid surface height detection means or liquid level detection means, but in the present invention, as the liquid surface height detection means or liquid level detection means, the other appropriate means may also be used such as mechanical means using a float, optical means for detecting reflection of light by the liquid surface, and electric means for detecting difference of electric characteristics such as an electric resistance value above/below the liquid surface. In this case, if necessary, a liquid surface height detection tube passage of the vertical direction may also be disposed separately from the measurement tube passage.

Figure 20:
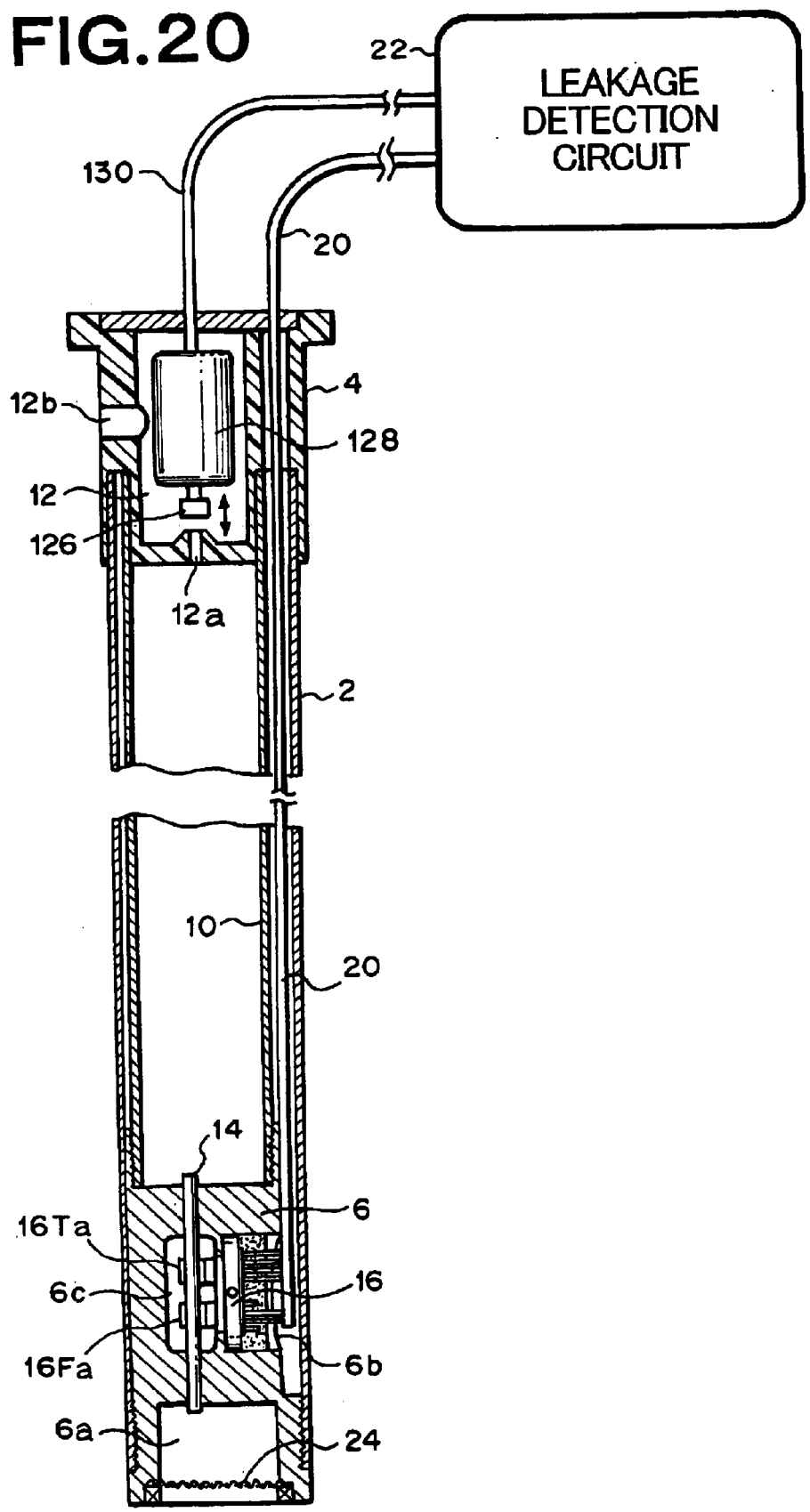
FIG. 20 is a partially omitted sectional view showing the device for detecting the leakage of liquid in the tank according to the present invention.
Figure 21:
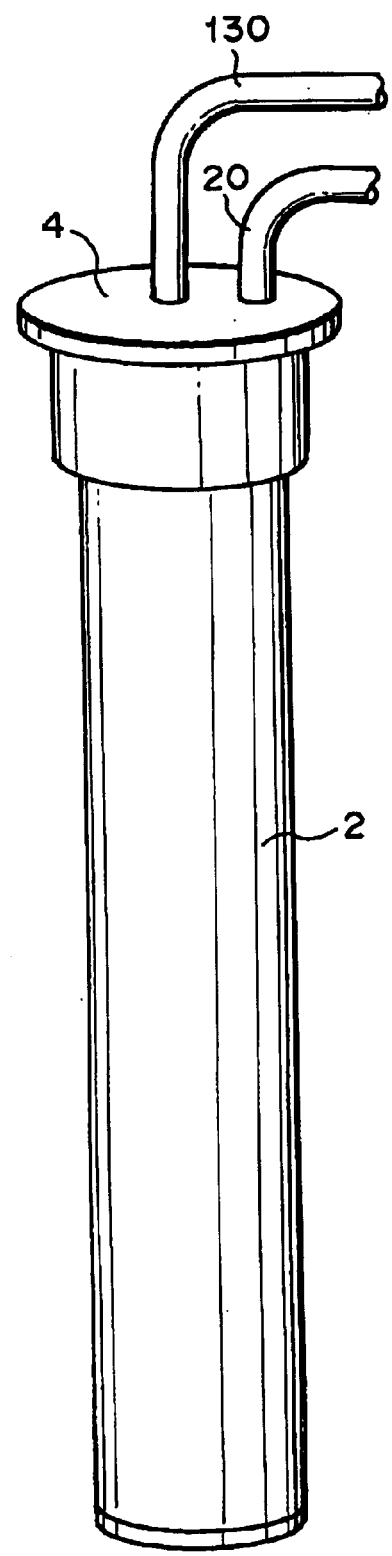
FIG. 21 is a partial perspective view showing the device for detecting the leakage of liquid in the tank according to the present invention.

(3) FIG. 20 is a partially omitted sectional view showing an embodiment of the device for detecting the leakage of liquid in the tank according to the present invention, and FIG. 21 is a partial perspective view of the device. The present embodiment is different from the embodiment described with reference to FIGS. 1 to 8C in the following respects, but is the same in the other respects.

In the present embodiment, the communication path 12 formed in the cap member 4 allows the inside of the measurement tube 10 to communicate with the outside of the cap member 4 via small holes 12a, 12b. The sensor 16 is used for measurement of the flow rate of the liquid in the measurement thin tube 14 and the integrated value of the flow rate to detect the leakage, and is connected to the leakage detection circuit 22 via the sensor wiring 20.

The measurement thin tube 14 and sensor 16 of the device of the present embodiment are similar to those of FIGS. 3A and 3B and 4A and 4B.

As shown in FIG. 20, an open/close valve 126 and a driver (driving unit) 128 for the valve are disposed in the communication path 12. The open/close valve 126 is movable in the vertical direction between a closed position (downward position) to close the small hole 12a and an open position (upward position) separated from the small hole 12a. Such a valve mechanism may be constituted, for example, by an electromagnetic valve. When the open/close valve 126 is in the open position, the inside of the measurement tube 10 communicates with the outside of the cap member 4. However, when the open/close valve 126 is in the closed position, the inside of the measurement tube 10 is disconnected from the outside of the cap member 4. The driver 128 is connected to the leakage detection circuit 22 via a driving wiring 130.

Figure 22:
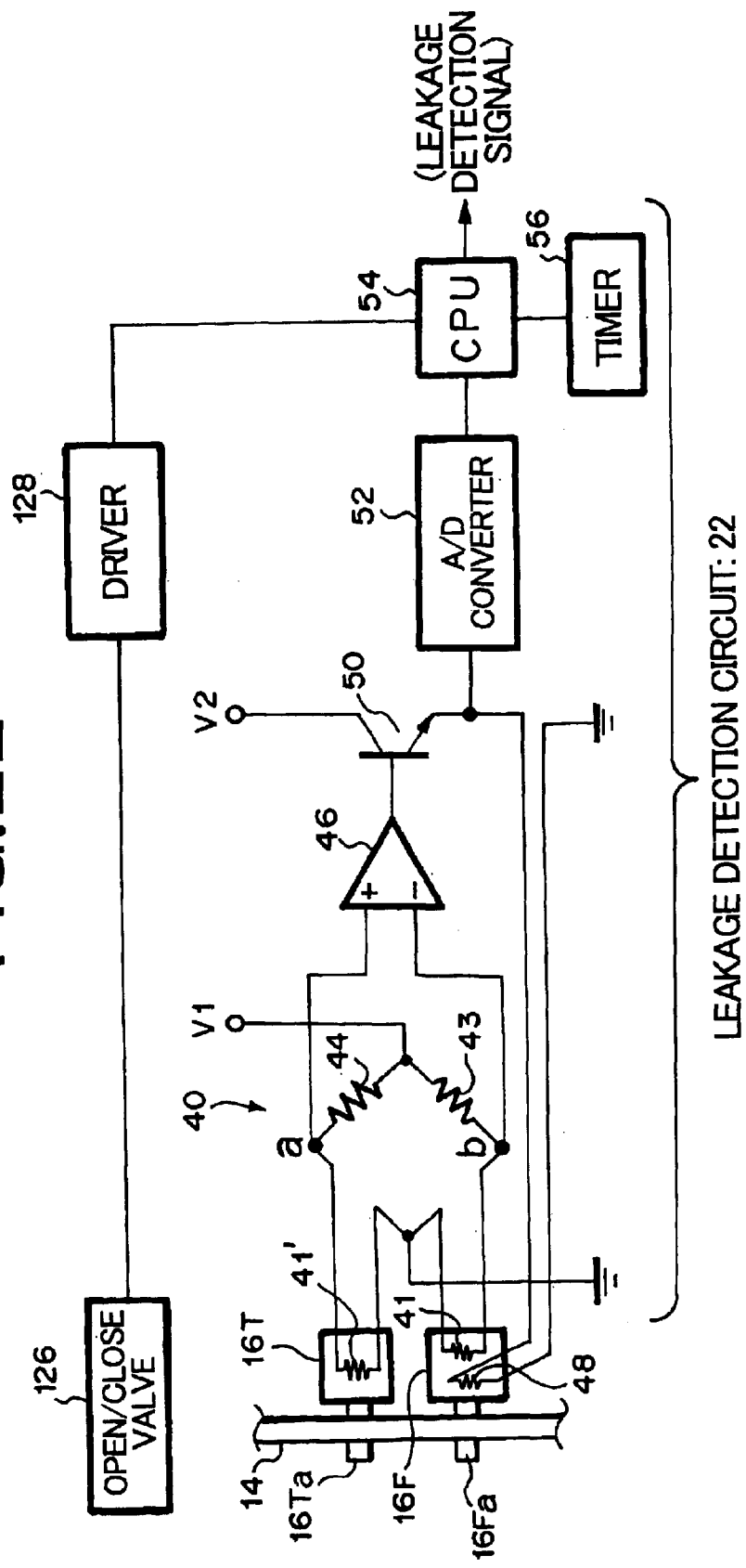
FIG. 22 is a schematic diagram showing the leakage detection circuit.

FIG. 22 is a schematic diagram showing the leakage detection circuit 22 constituting the leakage detection means including the circuit for measuring the flow rate using the sensor 16 and detecting the leakage by controlling the communication between the inside and outside of the upper part of the measurement tube 10 with use of the open/close valve 126 and driver 128. The circuit for measuring the flow rate is similar to the circuit of the thermal flowmeter of the indirectly heated type described, for example, in JP-A-11-118566, and outputs the electric signal in accordance with the instantaneous flow rate of the liquid circulated in the measurement thin tube 14. By the appropriate integration, the electric signal may also be output in accordance with the integrated flow rate. The leakage detection circuit 22 is different from that shown in FIG. 5 in the following respects, but is the same in the other respects.

Figure 23:
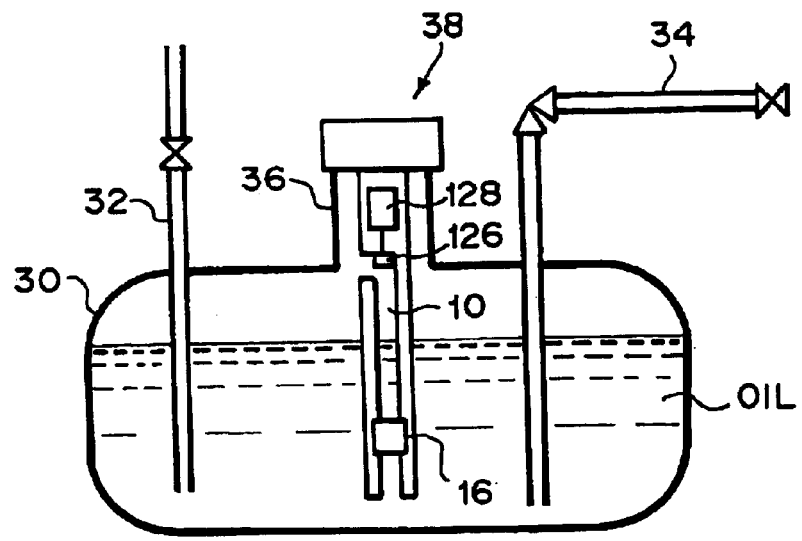
FIG. 23 is a schematic sectional view showing the state in which the device for detecting the leakage of liquid in the tank according to the present invention is attached to the tank.
Figure 24:
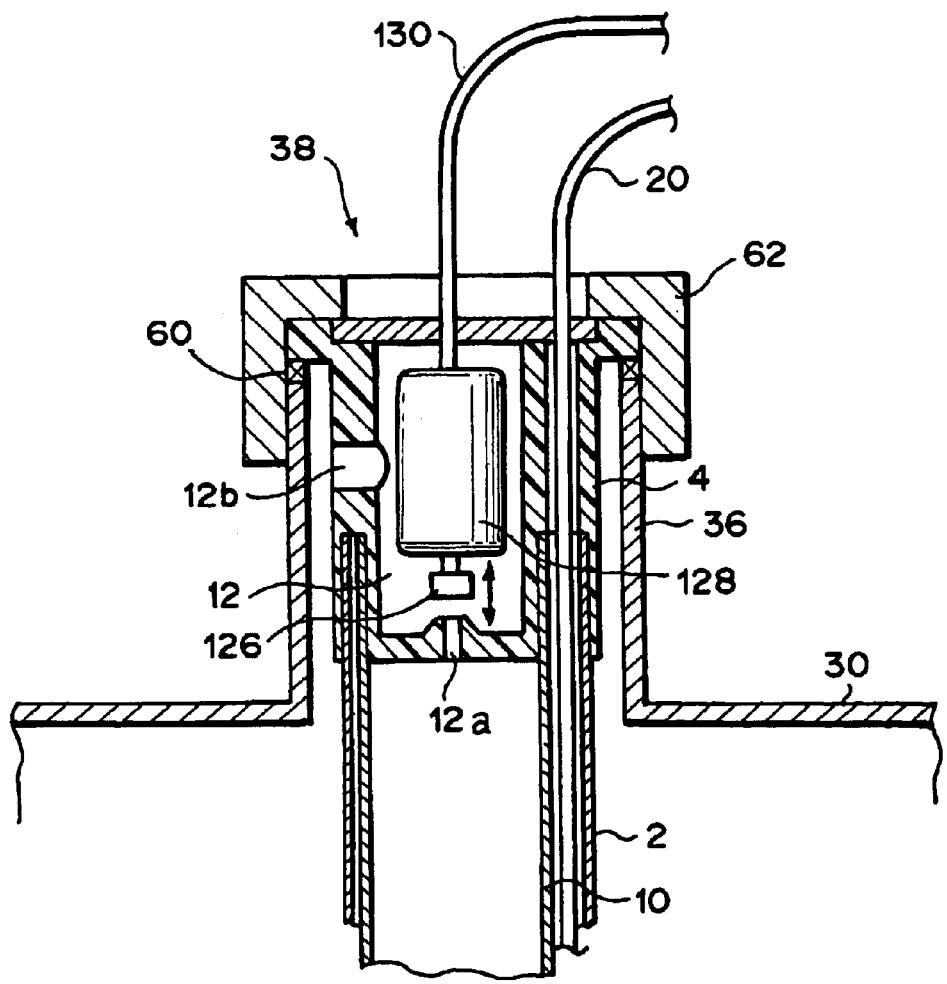
FIG. 24 is an enlarged sectional view of the fixing portion of the device for detecting the leakage of liquid in the tank according to the present invention to the tank.

That is, the CPU 54 is connected to a timer 56. FIG. 23 is a schematic sectional view showing the state in which the leakage detection device of the present embodiment is attached to the tank, and this state is similar to FIG. 6. FIG. 24 is an enlarged sectional view of the fixing portion of the leakage detection device onto the tank, and this state is similar to FIG. 7.

Next, the leakage detection operation in the leakage detection device of the present embodiment will be described. The leakage detection operation is performed in a state in which the petroleum OIL is not replenished from the outside via the oil intake tube 32 and the petroleum OIL is not pumped out to the outside via the oil supply tube 34. This state is realized, for example, in a non-business hour zone such as nighttime.

Figure 25A:
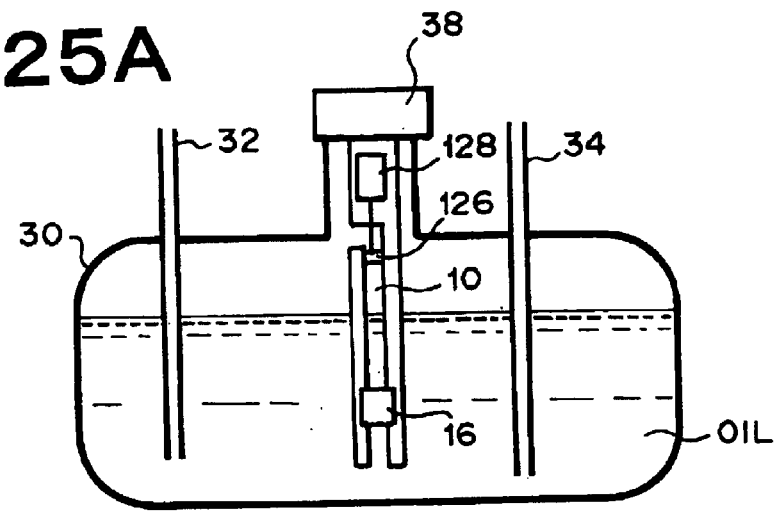
FIGS. 25A to 25C are schematic diagrams showing the liquid level fluctuation in the tank during the leakage detection in the device for detecting the leakage of liquid in the tank according to the present invention.
Figure 25B:
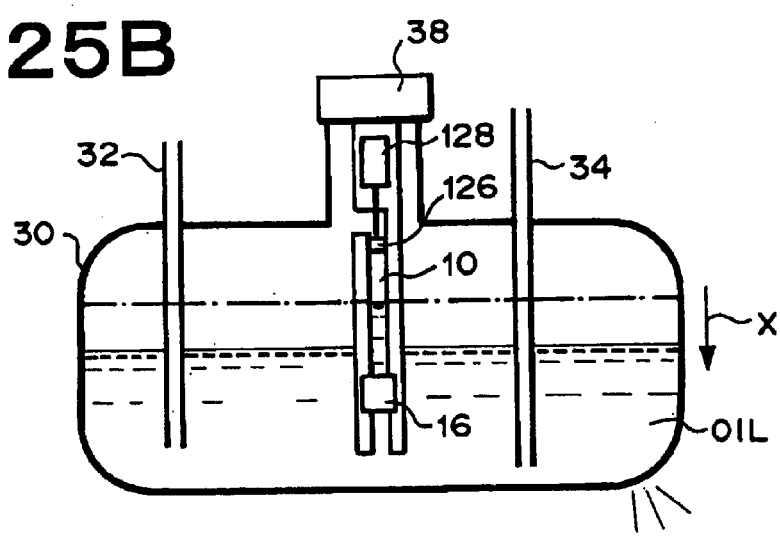
Figure 25C:
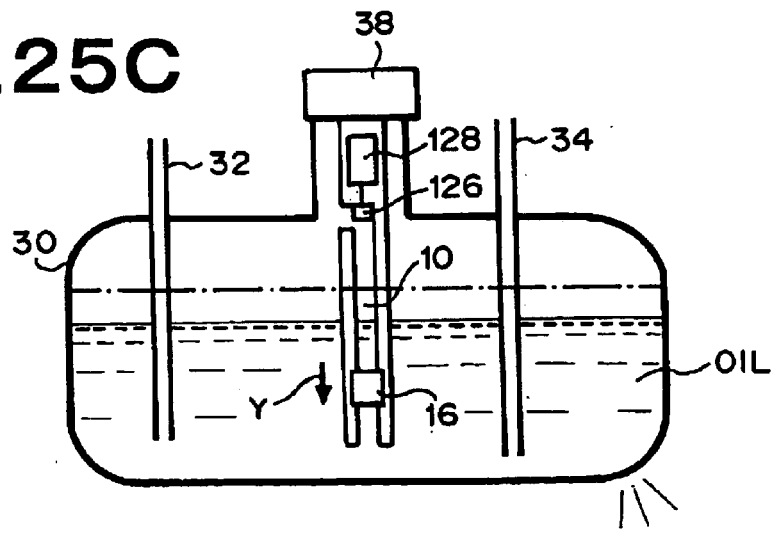

FIGS. 25A to 25C are schematic diagrams showing the liquid surface fluctuation in the tank during the leakage detection. First, as shown in FIG. 25A, the open/close valve 126 is moved downwards to the closed position by the driver 128. Thereafter, the open/close valve 126 is maintained in the closed position for a predetermined time (e.g., four to twelve hours). When the petroleum OIL leaks from the tank 30, after the lapse of the predetermined time, as shown in FIG. 25B, the liquid surface level in the tank 30 except the inside of the measurement tube 10 lowers as shown by an arrow X. The liquid surface level in the measurement tube 10 of the detection device 38 does not lower, because the open/close valve 126 is in the closed position.

Figure 26:
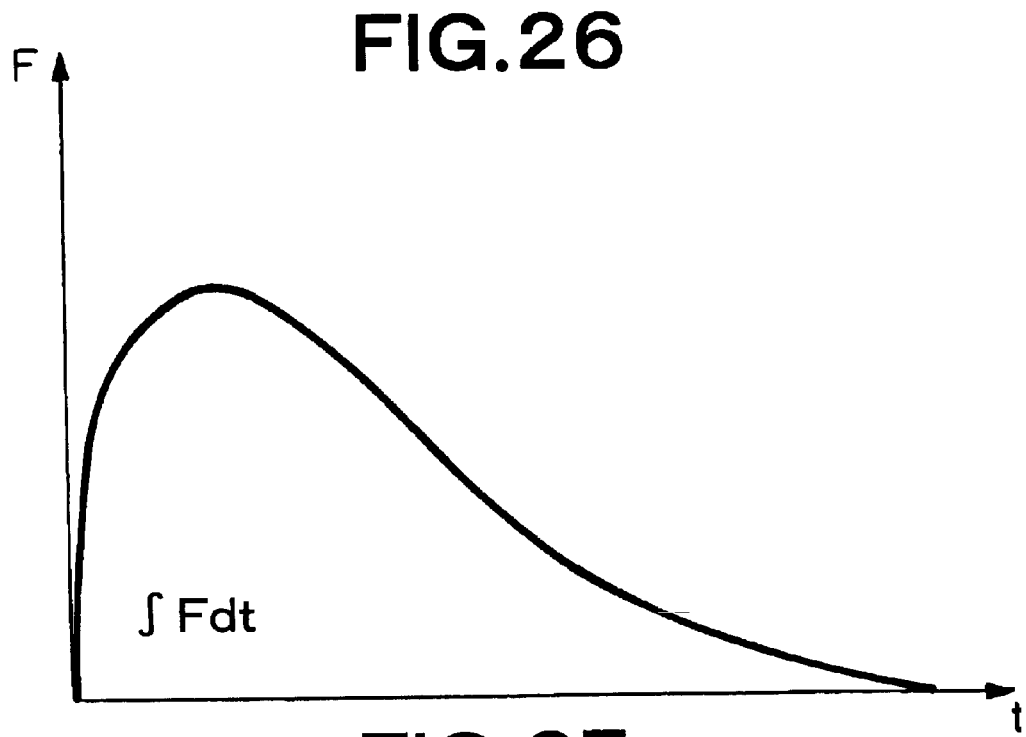
FIG. 26 is a diagram showing a change with time in a detected flow rate by the device for detecting the leakage of liquid in the tank according to the present invention.

Next, as shown in FIG. 25C, the open/close valve 126 is moved upwards to the open position by the driver 128. Accordingly, the liquid surface level in the measurement tube 10 of the leakage detection device 38 lowers until the liquid surface level is equal to that in the tank 30 excluding the inside of the measurement tube 10. In this case, the flow rate F based on the downward flow as shown by an arrow Y is detected in the flow rate measurement circuit using the sensor 16. As shown in FIG. 26, the detected flow rate changes with a time t.

Since an integrated value $IF = \int F dt$ obtained by integrating the flow rate F with time corresponds to the leakage amount of the petroleum OIL in the tank 30 in the predetermined time, the CPU 54 calculates the integrated value IF based on the flow rate input from the A/D converter 52, and performs the following processes in accordance with the magnitude of the flow rate integrated value:

(i) judges that there is not any leakage in a case where the flow rate integrated value is less than a predetermined value; and (ii) judges that there is leakage to emit the leakage detection signal in a case where the flow rate integrated value is not less than the predetermined value.

The reason why it is judged that there is not any leakage in a case where the flow rate integrated value is less than the predetermined value is that the measurement error in the flow rate measurement is considered. If the measurement error can be reduced, the predetermined value can be reduced.

A timing of the operation (especially a timing to start the states of FIGS. 25A and 25C) can be set beforehand in the timer 56. Alternatively, the operation timing may also be set by manual input into input means (not shown).

As described above, in the present embodiment, the leakage is detected based on the flow rate integrated value corresponding to the amount of the petroleum OIL which has leaked from the tank 30 in the predetermined time. Therefore, even with a remarkably small amount of leakage per unit time, the leakage can be detected accurately.

Figure 27:
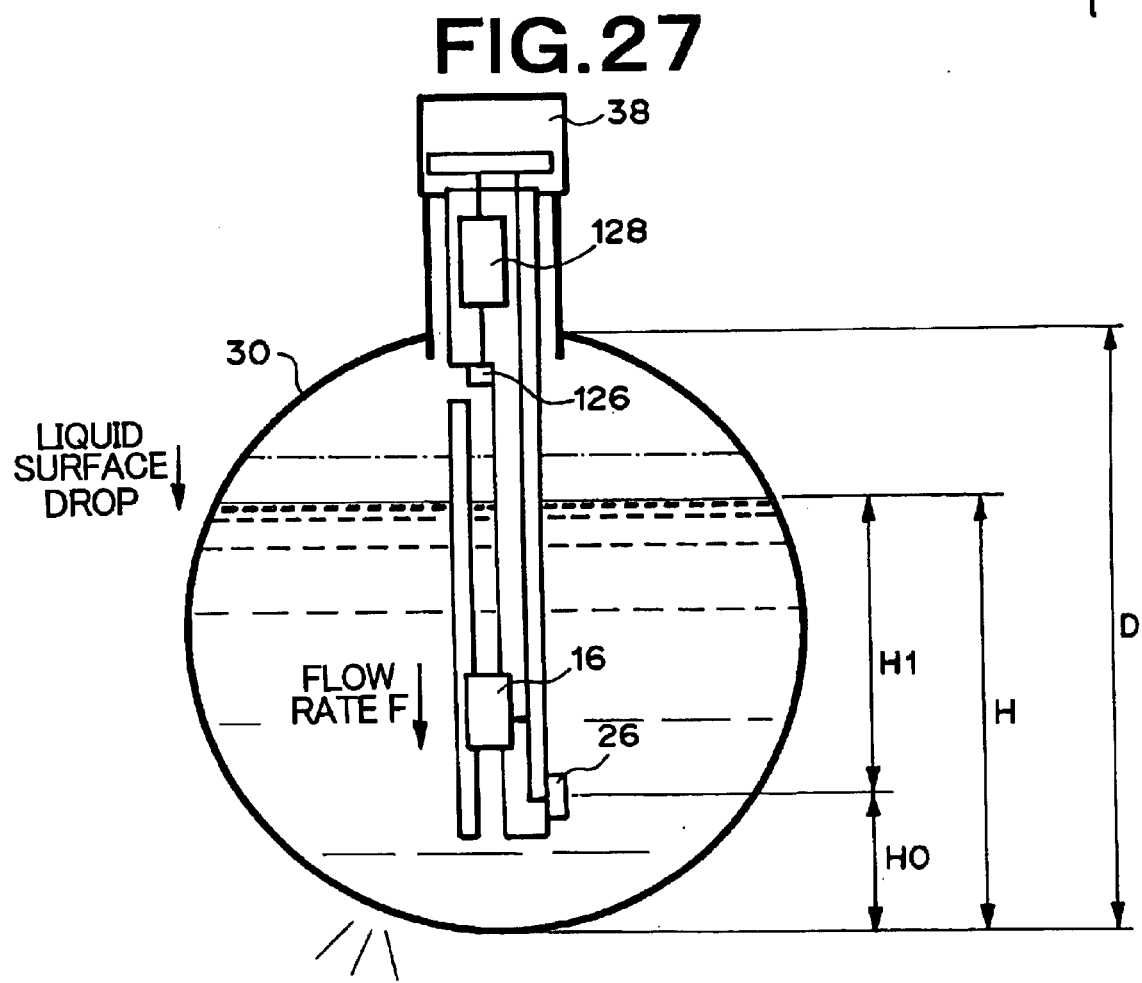
FIG. 27 is a schematic sectional view showing the leakage detection by the device for detecting the leakage of liquid in the tank according to the present invention.

Additionally, the shape of the tank 30 does not necessarily have a uniform transverse cross-sectional area (horizontal cross-sectional area) with respect to the vertical direction. That is, as shown in FIG. 27, in the cylindrical tank whose vertical sectional shape is circular, the lower or upper height portion of the tank is small in transverse cross-sectional area as compared with the intermediate height portion of the tank. On the other hand, the measurement tube 10 of the detection device has a uniform transverse area (horizontal cross-sectional area) with respect to the vertical direction. Therefore, even when the integrated value IF of the flow rate of the petroleum OIL flowing in the measurement thin tube 14 with the fluctuation of the liquid level in the measurement tube 10 is constant (i.e., the fluctuation amount of the liquid level is constant), but when the liquid level is in the lower or upper height portion of the tank, the fluctuation of the petroleum amount in the whole tank is small as compared with a case where the liquid level is in the intermediate height portion. Therefore, even when the equal flow rate integrated value is detected, the amount of the leakage of the petroleum differs with the height of the liquid level in the tank.

In the embodiment of the leakage detection device of the liquid in the tank according to the present invention described below, to solve the technical problem based on the leakage amount which is not proportional to the detected flow rate integrated value with the liquid level, the liquid level H is detected, the detected flow rate integrated value is corrected based on this liquid level to obtain a corrected flow rate integrated value, and the leakage is detected based on the magnitude of the corrected flow rate integrated value.

That is, in the present embodiment, as shown in FIG. 27, the pressure sensor 26 which detects the liquid pressure received from the liquid in the tank is disposed as the liquid surface height detection means or liquid level detection means for use in detecting the height or level of the surface of the liquid. The pressure sensor 26 is constituted in such a manner that the pressure receiving surface portion undergoes the liquid pressure from the liquid in the tank outside the sheath tube with the insertion of the detection device into the tank. The pressure sensor 26 is connected to the leakage detection circuit 22 via a wiring extending in a path similar to that of the sensor 16. The output of the pressure sensor 26 (output corresponding to the liquid surface height) is A/D converted, and input into the CPU 54.

The values of the parameters concerning the shape of the tank are input into the CPU 54 by input means (not shown). The parameter may be, for example, the ratio of the effective cross-sectional area (horizontal cross-sectional area obtained by removing the horizontal cross-sectional area of the measurement tube 10 [the cross-sectional area of the internal space of the measurement tube 10 is not removed]) of the internal space of the tank with respect to the cross-sectional area (horizontal cross-sectional area) of the inner space of the measurement tube 10 in the equal height. Such a parameter can be prepared beforehand based on the shapes of the tank 30 and the measurement tube 10 of the detection device 38 attached to the tank. The parameter has been described with reference to FIG. 17.

It is to be noted that in addition to the above-described parameter, examples of the parameter concerning the shape of the tank include the inner diameter D and the length L of the tank (dimension in a direction vertical to the sheet surface of FIG. 27). In this case, the above-described ratio is obtained by the calculation in the CPU 54.

Moreover, when the type or specific gravity of the liquid in the tank 30 is input, the height of the liquid level detected using the pressure sensor 26 can be calibrated in the CPU 54.

The CPU 54 calculates the corrected integrated value based on the integrated value IF obtained in the same manner as in the above-described embodiment and the value corresponding to the liquid surface level height input from the pressure sensor 26. The corrected integrated value may be obtained by multiplying the parameter value (the above-described ratio) corresponding to the liquid surface level height H obtained based on the input value from the pressure sensor 26 by the flow rate integrated value. It is to be noted that as the value corresponding to the liquid surface level height for use in correction, any value before/after the liquid surface drop may be used, or an average value of values before/after the liquid surface drop may also be used. This is because the leakage amount is usually sufficiently small as compared with a capacity of the whole tank, and the parameter value does not largely change before/after the liquid surface drop.

In the present embodiment, the corrected integrated value is calculated, and the following processes are performed in accordance with the magnitude of the corrected integrated value:

(i) it is-judged that there is not any leakage in a case where the corrected integrated value is less than a predetermined value (may also be different from the predetermined value of the above-described embodiment); and (ii) it is judged that there is leakage to emit the leakage detection signal in a case where the corrected integrated value is not less than the predetermined value.

In the present embodiment, the pressure sensor which detects the liquid pressure received from the liquid in the tank is used as the liquid surface height detection means or liquid level detection means, but in the present invention, as the liquid surface height detection means or liquid level detection means, the other appropriate means may also be used such as the mechanical means using the float, optical means for detecting the reflection of light by the liquid surface, and electric means for detecting the difference of electric characteristics such as the electric resistance value above/below the liquid surface. In this case, if necessary, the liquid surface height detection tube passage of the vertical direction may also be disposed separately from the measurement tube passage.

Figures 28, 29:
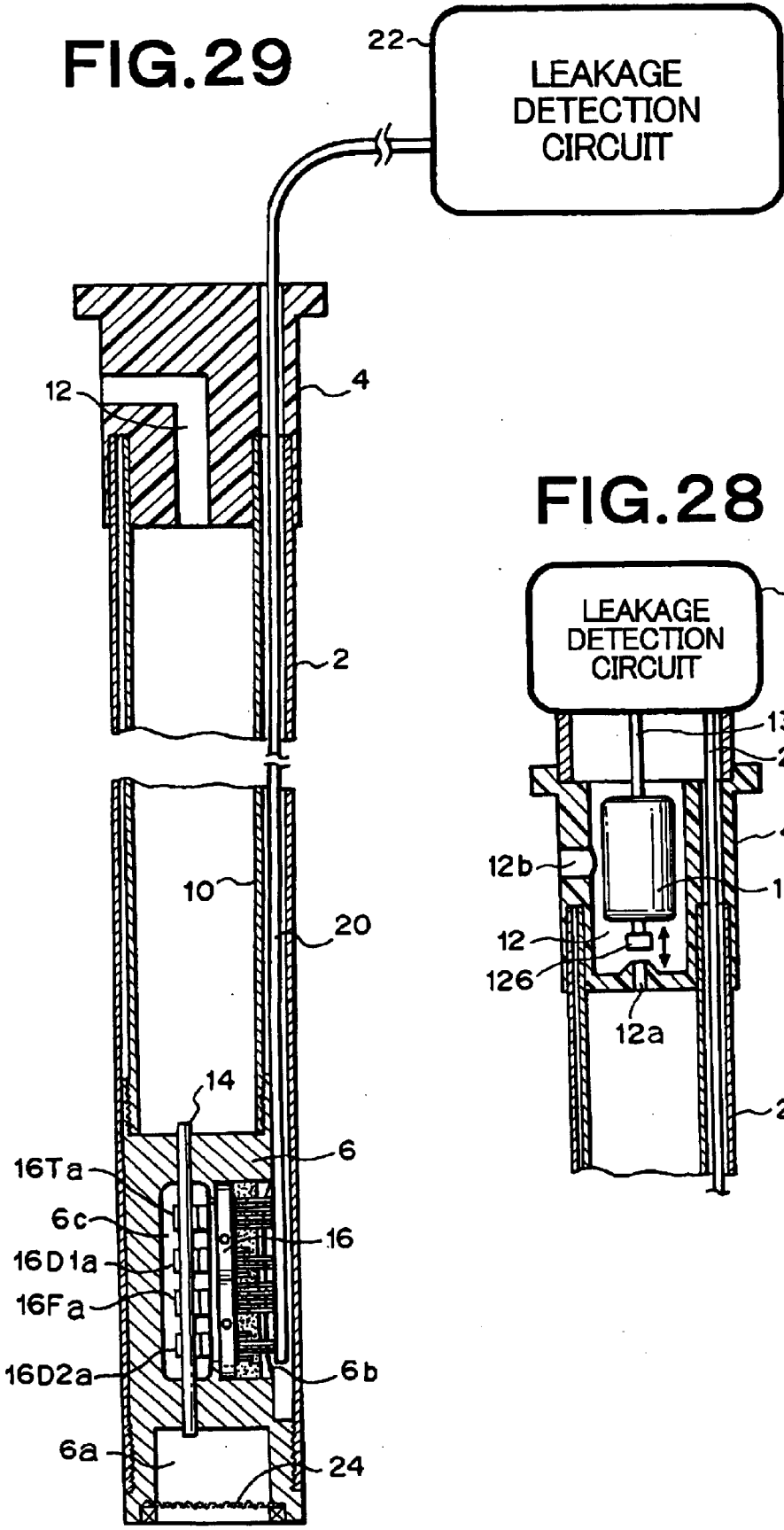
FIG. 28 is a partial sectional view showing the device for detecting the leakage of liquid in the tank according to the present invention.
FIG. 29 is a partially omitted sectional view showing the device for detecting the leakage of liquid in the tank according to the present invention.

FIG. 28 is a partial sectional view showing another embodiment of the device for detecting the leakage of liquid in the tank according to the present invention. In the embodiment, the leakage detection circuit 22 is housed in the member integrated with the cap member 4. This miniaturizes the device. The constitution and function of the leakage detection circuit 22 are similar to those of the above-described embodiment.

In a modification of the present embodiment, as in the embodiment described with reference to FIG. 11, in the sensor holder member 6, the bypass 66 of the vertical direction for allowing the measurement tube 10 to communicate with the concave portion 6a is disposed separately from the measurement thin tube 14. The check valve 68 is attached to the bypass 66, and the check valve 68 inhibits the petroleum OIL in the bypass 66 from being circulated downwards.

(4) FIG. 29 is a partially omitted sectional view showing an embodiment of the device for detecting the leakage of liquid in the tank according to the present invention. The present embodiment is different from the embodiment described with reference to FIGS. 1 to 8C in the following respects, but is the same in the other respects.

In the sensor holder member 6, a sensor portion 16 for detecting the leakage is disposed in the sensor housing concave portion 6b. The sensor portion 16 is connected to the leakage detection circuit 22 via the wiring 20. As shown in the drawings, the wiring 20 extends through the space inside the sheath tube 2 and outside the measurement tube 10 and through the through hole formed in the cap member 4 in the vertical direction. The lower end portion of the sensor holder member 6 is provided with the filter mesh 24 to cover the concave portion 6a.

Figure 30A:
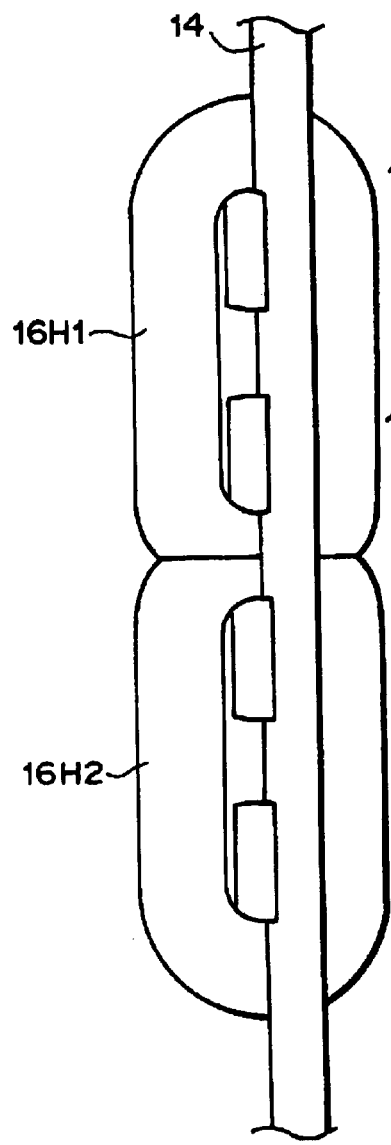
FIG. 30A is a plan view showing the measurement thin tube and the sensor.
Figure 30B:
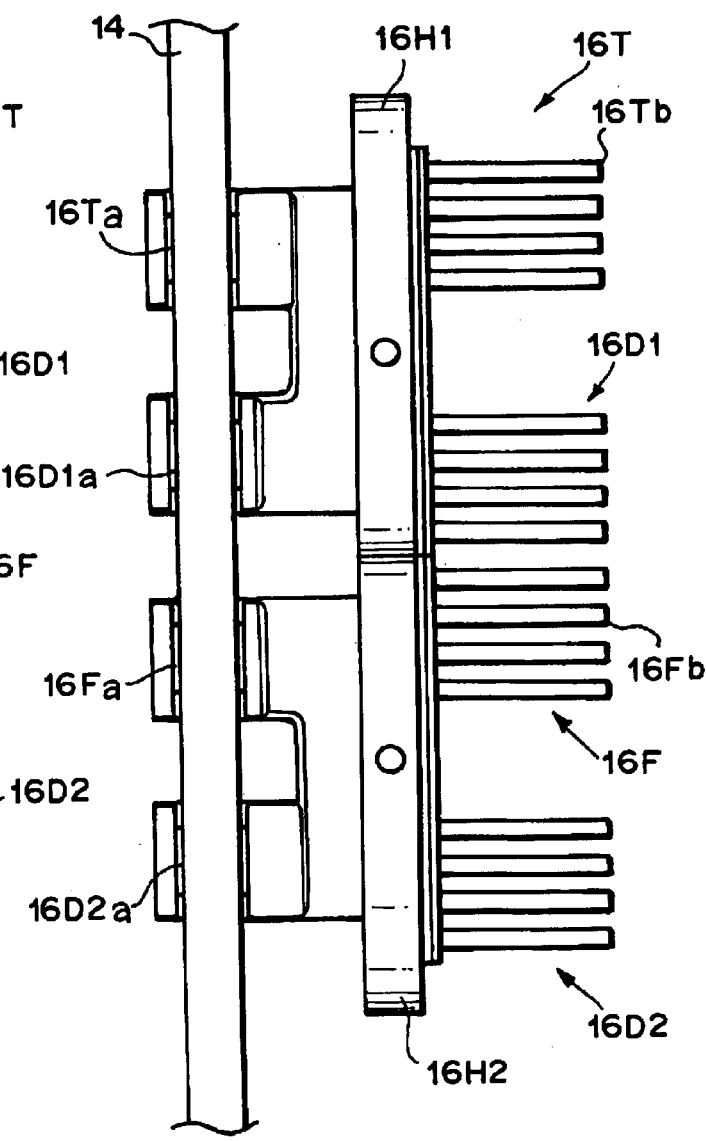
FIG. 30B is a side view showing the measurement thin tube and the sensor.
Figure 31A:
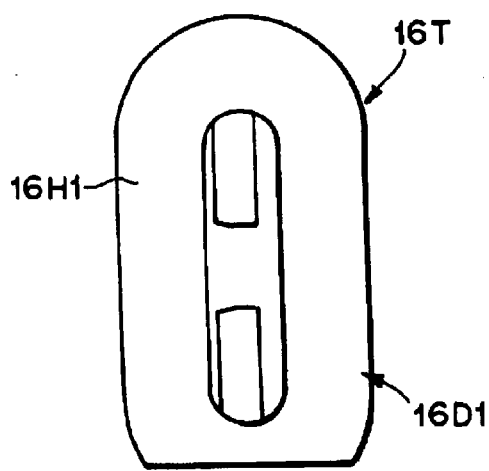
FIG. 31A is a plan view showing a sensor section.
Figure 31B:
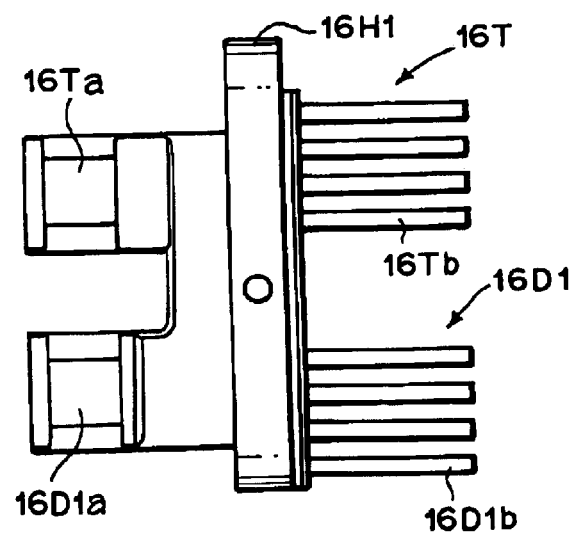
FIG. 31B is a side view showing the sensor section.

FIGS. 30A and 30B are diagrams showing the measurement thin tube 14 and sensor portion 16 and, in particular, FIG. 30A shows a front view and FIG. 30B shows a side view. The sensor portion 16 includes a first sensor for use in measuring the flow rate of the liquid in the measurement thin tube 14 and a second sensor for use in detecting the direction of the flow of the liquid in the measurement thin tube 14. The first sensor is the thermal flow rate sensor of the indirectly heated type, and includes the flow rate detection section 16F and temperature detection section 16T. The second sensor includes a pair of thermo-sensors 16D1, 16D2 arranged above and below the flow rate detection section 16F constituting the first sensor. The temperature detection section 16T and thermo-sensor 16D1 are integrated by a common resin housing 16H1. The flow rate detection section 16F and thermo-sensor 16D2 are integrated by a common resin housing 16H2. FIGS. 31A and 31B are diagrams showing the temperature detection section 16T and thermo-sensor 16D1 integrated by the housing 16H1 and, in particular, FIG. 31A is a front view and FIG. 31B is a side view. The flow rate detection section 16F and thermo-sensor 16D2 integrated by the housing 16H2 also has a similar appearance.

In the first sensor, the flow rate detection section 16F and temperature detection section 16T include the heat transfer members 16Fa, 16Ta and electrode terminals 16Fb, 16Tb. The heat transfer members 16Fa, 16Ta of the flow rate and temperature detection sections both contact the outer surface of the measurement thin tube 14, and this makes possible the heat exchange between the flow rate detection section 16F and temperature detection section 16T and the liquid in the measurement thin tube 14.

In the second sensor, the thermo-sensors 16D1, 16D2 include heat transfer members 16D1a, 16D2a and electrode terminals 16D1b, 16D2b. The heat transfer members 16D1a, 16D2a of the thermo-sensor both contact the outer surface of the measurement thin tube 14, and this makes possible the heat exchange between the thermo-sensors 16D1, 16D2 and the liquid in the measurement thin tube 14.

As shown in FIG. 29, the heat transfer members 16Fa, 16Ta; 16D1a, 16D2a of the first and second sensors contact the measurement thin tube 14 in the detection cavity 6c formed in the sensor holder member 6. It is to be noted that the device of the present embodiment has an appearance similar to that of FIG. 2.

FIG. 32 is a schematic diagram showing the leakage detection circuit 22 constituting the leakage detection means including a circuit for measuring the flow rate using the first sensor and a circuit for detecting the direction of a fluid flow using the second sensor. In the drawings, the measurement thin tube 14 is shown as four parts 14-1, 14-2, 14-3, 14-4, and additionally these parts are described in an order different from an actual arrangement in order to show the first and second sensors individually. That is, as shown in FIG. 29, actually, the parts 14-1, 14-2, 14-3, 14-4 in the measurement thin tube 14 are arranged downwards from above in this order.

The circuit for measuring the flow rate is similar to the circuit of the thermal flowmeter of the indirectly heated type described, for example, in JP-A-11-118566, and outputs the electric signal in accordance with the instantaneous flow rate of the liquid circulated in the measurement thin tube 14. By the appropriate integration, the electric signal may also be output in accordance with the integrated flow rate.

The leakage detection circuit 22 is different from that shown in FIG. 5 in the following respects, but is the same in the other respects.

That is, in the circuit for detecting the direction of the fluid flow, outputs corresponding to fluid temperature obtained by a pair of thermo-sensors 16D1, 16D2 are input into a subtracter 70, an output value of the thermo-sensor 16D1 corresponding to fluid temperature is subtracted from that of the thermo-sensor 16D2, an obtained subtracter output is input into a sign distinction unit 72, a sign (positive/negative) is distinguished, and an output indicating the distinction result is input into the CPU 54. It is to be noted that the thermo-sensors 16D1, 16D2 include a constitution similar to that of the temperature detection section 16T, and an output corresponding to the fluid temperature is obtained using a resistance change of the thermo-sensing resistor by the temperature.

Figure 33:
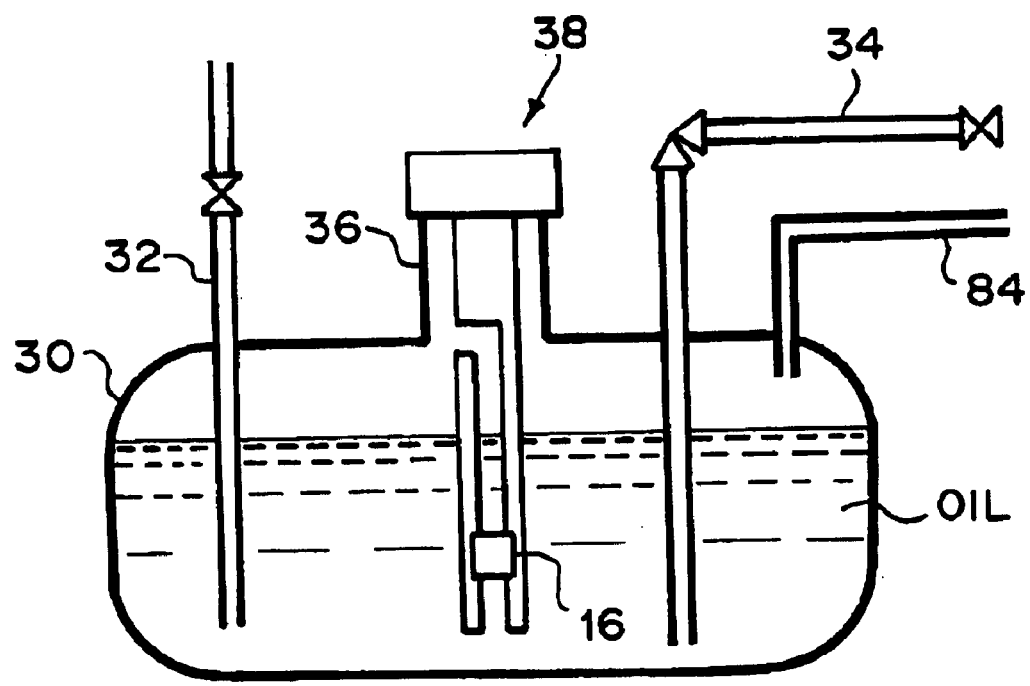
FIG. 33 is a schematic sectional view showing the state in which the device for detecting the leakage of liquid in the tank according to the present invention is attached to the tank.

FIG. 33 is a schematic sectional view showing the state in which the leakage detection device of the present embodiment is attached to the tank, and this state is similar to FIG. 6. The fixing portion of the device of the present embodiment onto the tank is similar to that of FIG. 7.

As shown in FIG. 33, in the present embodiment, the tank 30 is connected to a return tube 84. When an amount of the petroleum OIL pumped out to the outside of the tank 30 via the oil supply tube 34 is greater than a demanded amount, the return tube 84 is used for returning an excessive amount of petroleum OIL back into the tank 30. An example of the tank provided with the return tube is shown in FIG. 34.

FIG. 34 is a schematic diagram of a centralized supply system of petroleum (kerosene) OIL in a large-scaled apartment house. In FIG. 34, the petroleum OIL in the tank 30 is pumped up on demand via the oil supply tube 34 by pumps 81a, 81b whose operations are controlled by a centralized control unit 81, and supplied to floor tanks 83 via a supply piping 82. The petroleum OIL in each floor tank 83 is supplied to dwelling units 86 via each floor piping 85, and supplied to a petroleum combustion apparatus via an integrated flowmeter 87 in each dwelling unit 86.

Control is performed so as to supply to each floor tank 83 a required amount of petroleum OIL which does not overflow, but in case of overflow, the petroleum OIL is returned to the tank 30 via the return tube 84.

Next, the leakage detection operation in the leakage detection device of the present embodiment will be described.

Figure 35C:
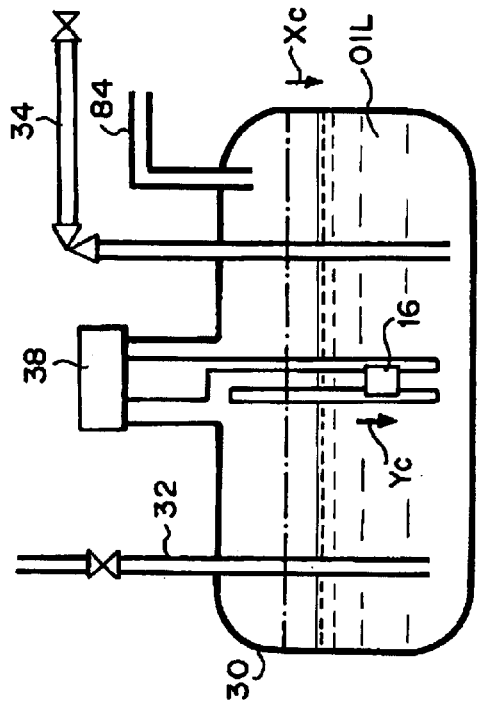
FIGS. 35A to 35D are schematic diagrams showing the pattern of the liquid level fluctuation in the tank.
Figure 35D:
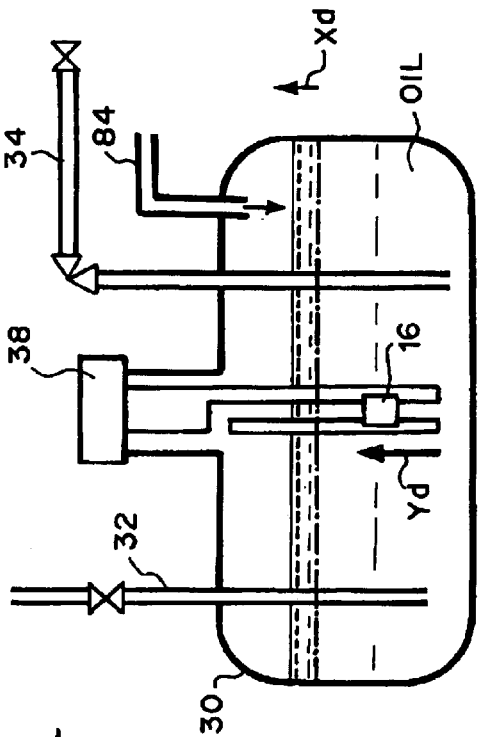
Figure 35A:
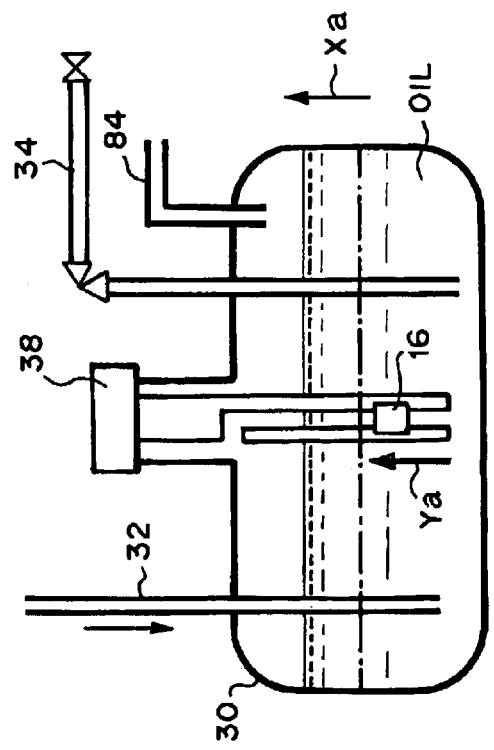
Figure 35B:
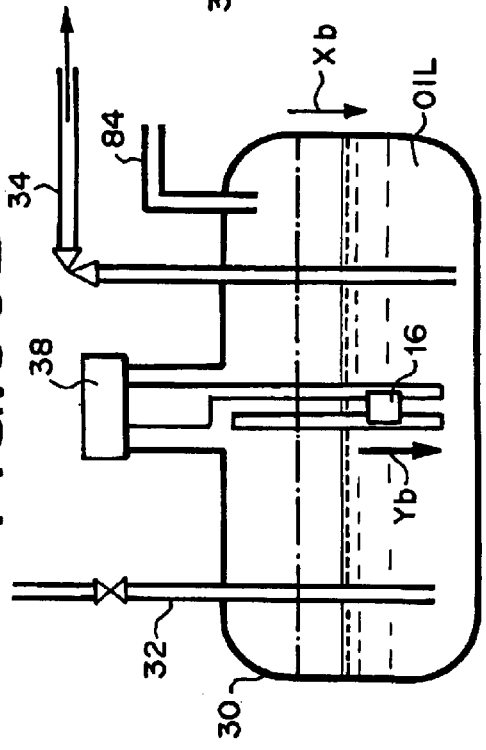

FIGS. 35A to 35D are schematic diagrams showing the patterns of the liquid level fluctuations in the tanks. FIG. 35A shows that the petroleum OIL is replenished into the tank 30 via the oil intake tube 32. In this case, the liquid surface level in the tank 30 rapidly rises as shown by the arrow Xa. Therefore, the liquid surface level in the measurement tube of the detection device 38 rapidly rises, and accordingly the large flow rate is detected based on the upward flow as shown by the arrow Ya in the flow rate measurement circuit using the first sensor of the sensor portion 16. It is to be noted that when the oil leaks from the tank 30, a slightly smaller flow rate is detected. FIG. 35B shows that the petroleum OIL is pumped out from the tank via the oil supply tube 34. In this case, the height (level) of the liquid surface in the tank 30 rapidly drops as shown by the arrow Xb. Therefore, the liquid surface level in the measurement tube of the detection device 38 also rapidly drops, and accordingly a large flow rate is detected based on the downward flow as shown by the arrow Yb in the flow rate measurement circuit using the first sensor of the sensor portion 16. It is to be noted that when the oil leaks from the tank 30, a slightly larger flow rate is detected. FIG. 35C shows that neither the replenishment of the petroleum OIL into the tank 30 via the oil intake tube 32 nor the pumping-out of the petroleum OIL from the tank via the oil supply tube 34 is performed and that the oil leaks from the tank 30. In this case, the liquid surface level in the tank 30 gradually drops. Therefore, the liquid surface level in the measurement tube of the detection device 38 gradually drops as shown by an arrow Xc, and accordingly a small flow rate is detected based on the downward flow as shown by an arrow Yc in the flow rate measurement circuit using the first sensor of the sensor portion 16. FIG. 35D shows that there is a return of the petroleum OIL into the tank 30 via the return tube 84. In this case, the liquid surface level in the tank 30 rises as shown by an arrow Xd. Therefore, the liquid surface level in the measurement tube of the leakage detection device 38 also rises, and accordingly the flow rate based on the upward flow as shown by an arrow Yd is detected in the flow rate measurement circuit using the first sensor of the sensor portion 16. It is to be noted that when the oil leaks from the tank 30, a slightly smaller flow rate is detected.

Since the flow rate detection section 16F of the first sensor generates heat as described above, the petroleum OIL is accordingly heated. Therefore, in case of the upward flow of the petroleum as shown in FIGS. 35A and 35D, in the second sensor, the temperature of the thermo-sensor 16D2 positioned below the flow rate detection section 16F is lower than that of the thermo-sensor 16D1 positioned above the flow rate detection section 16F. Accordingly, an output indicating a negative distinction result (indicating the upward flow) is obtained from the sign distinction unit 72. On the other hand, in case of the downward flow of the petroleum as shown in FIGS. 35B and 35C, in the second sensor, the temperature of the thermo-sensor 16D2 positioned below the flow rate detection section 16F is higher than that of the thermo-sensor 16D1 positioned above the flow rate detection section 16F. Accordingly, an output indicating a positive distinction result (indicating the downward flow) is obtained from the sign distinction unit 72.

Figure 36:
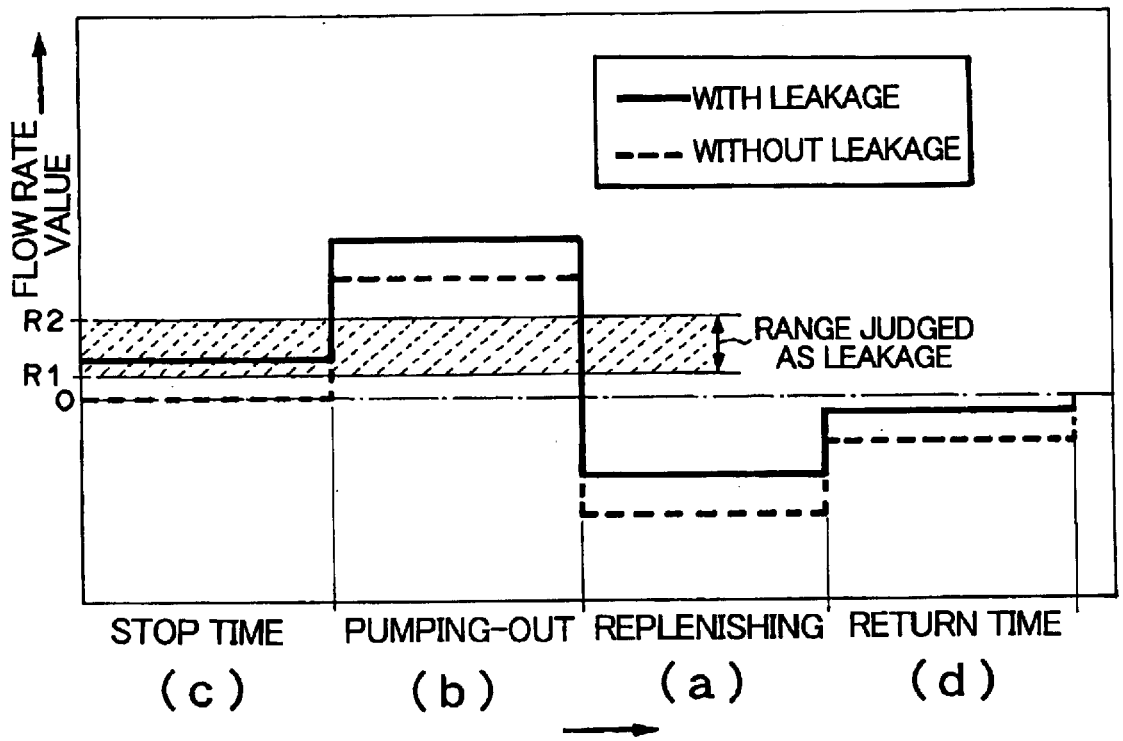
FIG. 36 is a diagram showing comparison of combinations of the flow rate values and flow directions in the respective patterns of the liquid level fluctuation in the tank.

FIG. 36 shows comparison of combinations of the directions of the fluid flows and the flow rate value in the respective patterns of the liquid level fluctuation described above. When the fluid flow in the measurement thin tube is directed downwards, a positive flow rate value is indicated. When the fluid flow in the measurement thin tube is directed upwards, a negative flow rate value is indicated. In FIG. 36, (c) "stop time" indicates a time at which none of the replenishment of the petroleum OIL into the tank 30 via the oil intake tube 32, the pumping-out of the petroleum OIL from the tank via the oil supply tube 34 and the returning of the petroleum OIL into the tank 30 via the return tube 84 is performed. In FIG. 36, (a), (b), (c), and (d) correspond to FIGS. 35A, 35B, 35C, and 35D. The flow rate values of replenishing (a) and pumping-out (b) can be known beforehand. In these cases, the absolute value of the flow rate is sufficiently greater than that of the flow rate in a case where there is leakage at the stop time (c). Therefore, such a flow rate value is avoided and, as shown in the drawings, when the flow rate value is in a range between a lower limit value R1 greater than 0 and an upper limit value R2 smaller than the flow rate value at the time (b), it is judged that there is leakage. It is to be noted that at the return time (d), even when the absolute value of the flow rate is between R1 and R2, the flow is directed upwards, and it is therefore to distinguish the time from the stop time (c).

That is, the CPU 54 shown in FIG. 32 judges that there is the leakage, and emits the leakage detection signal, in accordance with the combination the magnitude of the flow rate value input from the A/D converter 52 and the signal indicating the direction of the flow input from the sign distinction unit 72, only in a case where the flow has a downward direction (the sign of the flow rate value shown in FIG. 36 is positive) and the absolute value of the flow rate is R1 or more and R2 or less. The reason why it is judged that there is not any leakage in a case where the absolute value of the flow rate is less than R1 is that the measurement error in the flow rate measurement is considered. If the measurement error can be reduced, R1 can be reduced.

The petroleum OIL is temporarily replenished into the tank 30 via the oil intake tube 32, and further the petroleum OIL is also temporarily or intermittently pumped out from the tank via the oil supply tube 34. Therefore, the petroleum OIL also temporarily or intermittently returns to the tank 30 via the return tube 84 with the pumping-out of the petroleum OIL. On the other hand, the leakage of the petroleum OIL from the tank 30 is substantially continued once generated.

Therefore, in the leakage detection circuit 22, the leakage detection signal may also be emitted in a case where the direction of flow of the petroleum OIL detected using the second sensor is a downward direction and a leakage detection time duration when the flow rate measured using the first sensor is in the predetermined range (R1 or more and R2 or less) is not less than a predetermined time ratio within a predetermined time. That is, the leakage detection signal may be emitted in a case where the above-described leakage detection time duration is not less than a predetermined time ratio (e.g., 50 to 80%) in a predetermined time (e.g., two to ten hours) including the replenishing time (a), the pumping-out time (b), and the return time (c).

In a modification of the present embodiment, as in the embodiment described with reference to FIG. 10, the leakage detection circuit 22 is housed in the member integrated with the cap member 4.

Figure 37:
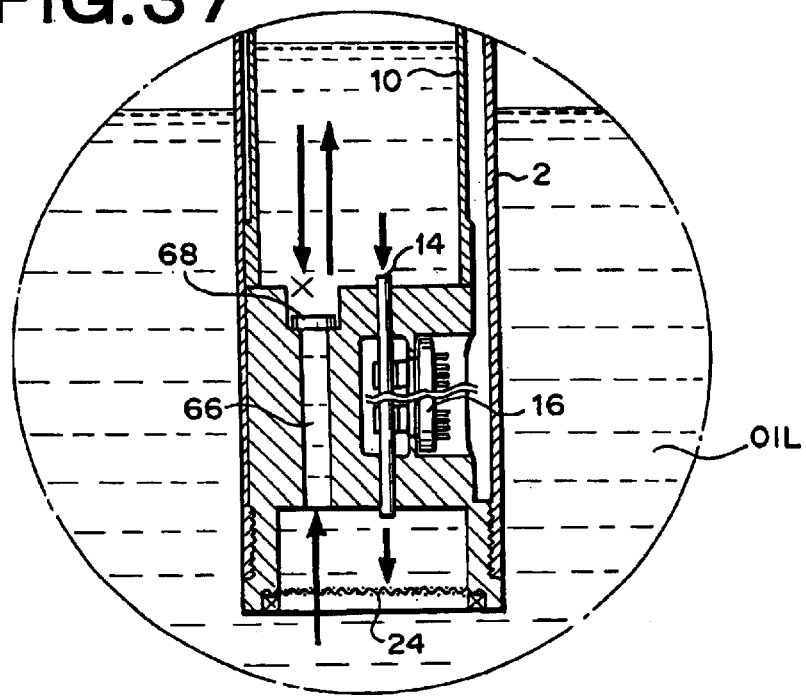
FIG. 37 is a partial sectional view showing the device for detecting the leakage of liquid in the tank according to the present invention.

Moreover, FIG. 37 is a partial sectional view showing still another embodiment of the device for detecting the leakage of liquid in the tank according to the present invention. In this embodiment, the structure described with reference to FIG. 11 is disposed.

Industrial Applicability (1) As described above, according to a leakage detection device of the present invention, a sensor for measuring a liquid flow rate is attached to a measurement thin tube communicating with a measurement tube and positioned below the measurement tube and having a cross-sectional area smaller than that of the measurement tube, and a leakage of liquid in a tank is detected based on the flow rate measured using the sensor. Therefore, it is possible to easily and accurately detect even a small amount of leakage without stopping the use of the tank. Furthermore, it is possible to attach the device without any special working with respect to the existing tank.

(2) Moreover, as described above, according to a leakage detection device of the present invention, a sensor for measuring a liquid flow rate is attached to a measurement thin tube communicating with a measurement tube and positioned below the measurement tube and having a cross-sectional area smaller than that of the measurement tube, further liquid surface height detection means or liquid level detection means is disposed, and a leakage of liquid in a tank is detected based on a corrected flow rate obtained by correcting the flow rate measured using the sensor based on a liquid surface height detected using the liquid level detection means and a value of a parameter concerning a tank shape. Therefore, it is possible to easily and accurately detect even a small amount of leakage without stopping the use of the tank. Furthermore, it is possible to attach the device without any special working with respect to the existing tank. According to the leakage detection device of the present invention, even with the tank having a shape whose transverse cross-sectional area changes with respect to a vertical direction, it is possible to accurately grasp a leakage amount, and it is possible to accurately detect the liquid leakage based on the leakage amount.

(3) Moreover, as described above, according to a leakage detection device of the present invention, a sensor for measuring a liquid flow rate is attached to a measurement thin tube communicating with a measurement tube and positioned below the measurement tube and having a cross-sectional area smaller than that of the measurement tube, and a leakage of liquid in a tank is detected based on an integrated value of a flow rate measured using the sensor after closing an open/close valve disposed in an upper part of the measurement tube for a predetermined time and subsequently opening the valve. Therefore, it is possible to easily and accurately detect even a small amount of leakage without stopping the use of the tank. Furthermore, it is possible to attach the device without any special working with respect to the existing tank. Furthermore, according to the leakage detection device of the present invention, the leakage of the liquid in the tank may be detected based on the corrected integrated value obtained based on the liquid surface height and the parameter value concerning the tank shape and therefore, even if the tank has a shape whose transverse cross-sectional area changes with respect to the vertical direction, it is possible to accurately grasp the leakage amount, and it is possible to accurately detect the liquid leakage based on the leakage amount.

(4) Additionally, as described above, according to a leakage detection device of the present invention, a first sensor for measuring a liquid flow rate and a second sensor for detecting a direction of a liquid flow are attached to a measurement thin tube communicating with a measurement tube and positioned below the measurement tube and having a cross-sectional area smaller than that of the measurement tube, and a leakage of liquid in a tank is detected based on a combination of the direction of the fluid flow detected using the second sensor with the flow rate measured using the first sensor. Therefore, even when the liquid returns into the tank via a return tube, it is possible to easily and accurately detect even a small amount of leakage without stopping the use of the tank. Furthermore, it is possible to attach the device without any special working with respect to the existing tank.

What is claimed is:

1. A device for detecting leakage of liquid in a tank, which is inserted into the tank to detect the leakage of liquid in the tank, comprising:
 a measurement tube passage into which the liquid in the tank is-introduced, the measurement tube passage including a measurement tube and a measurement thin tube communicating with the measurement tube and positioned below the measurement tube and having a cross-sectional area smaller than that of the measurement tube;
 a sensor for use in measuring a flow rate of the liquid in the measurement thin tube, the sensor being attached to the measurement thin tube; and
 leakage detection means for detecting the leakage of the liquid in the tank based on the flow rate measured using the sensor.

2. The device for detecting the leakage of liquid in the tank according to claim 1, wherein the cross-sectional area of the measurement thin tube is 1/50 or less of that of the measurement tube.

3. The device for detecting the leakage of liquid in the tank according to claim 1, wherein the cross-sectional area of the measurement thin tube is 1/100 or less of that of the measurement tube.

4. The device for detecting the leakage of liquid in the tank according to claim 1, wherein the cross-sectional area of the measurement thin tube is 1/300 or less of that of the measurement tube.

5. The device for detecting the leakage of liquid in the tank according to claim 1, wherein the measurement tube and the measurement thin tube are directed substantially in a vertical direction.

6. The device for detecting the leakage of liquid in the tank according to claim 1, wherein the sensor is a thermal flow rate sensor.

7. The device for detecting the leakage of liquid in the tank according to claim 6, wherein the thermal flow rate sensor includes a flow rate detection section and a temperature detection section, and the leakage detection means obtains the flow rate subjected to temperature compensation by an electric circuit comprising the flow rate detection section and the temperature detection section.

8. The device for detecting the leakage of liquid in the tank according to claim 7, wherein either of the flow rate detection section and the temperature detection section comprises a heat transfer member which contacts the outer surface of the measurement thin tube.

9. The device for detecting the leakage of liquid in the tank according to claim 1, wherein the leakage detection means emits a leakage detection signal, when the flow rate measured using the sensor is in a range greater than 0 and smaller than a flow rate value obtained during liquid replenishment into the tank or liquid pumping-out from the tank.

10. The device for detecting the leakage of liquid in the tank according to claim 1, wherein the measurement tube passage is formed through a sheath tube and a sensor holder member attached to a lower part of the sheath tube, the sensor holder member holds the sensor, and the measurement thin tube is disposed through the sensor holder member.

11. The device for detecting the leakage of liquid in the tank according to claim 10, wherein a cap member is attached to an upper part of the sheath tube, and the cap member is provided with a communication path for allowing the measurement tube to communicate with the outside and means for fixing the device to an opening of the tank.

12. A device for detecting leakage of liquid in a tank, which is inserted into the tank to detect the leakage of liquid in the tank, comprising:
 a measurement tube passage into which the liquid in the tank is introduced, the measurement tube passage including a measurement tube and a measurement thin tube communicating with the measurement tube and positioned below the measurement tube and having a cross-sectional area smaller than that of the measurement tube;
 a sensor for use in measuring a flow rate of the liquid in the measurement thin tube, the sensor being attached to the measurement thin tube;
 liquid level detection means for use in detecting a height of a surface of the liquid; and
 leakage detection means for detecting the leakage of the liquid in the tank based on a corrected flow rate obtained by correcting the flow rate measured using the sensor based on a liquid level detected using the liquid level detection means and a value of a parameter concerning the shape of the tank.

13. The device for detecting the leakage of liquid in the tank according to claim 12, wherein the cross-sectional area of the measurement thin tube is 1/50 or less of that of the measurement tube.

14. The device for detecting the leakage of liquid in the tank according to claim 12, wherein the cross-sectional area of the measurement thin tube is 1/100 or less of that of the measurement tube.

15. The device for detecting the leakage of liquid in the tank according to claim 12, wherein the cross-sectional area of the measurement thin tube is 1/300 or less of that of the measurement tube.

16. The device for detecting the leakage of liquid in the tank according to claim 12, wherein the measurement tube and the measurement thin tube are directed substantially in a vertical direction.

17. The device for detecting the leakage of liquid in the tank according to claim 12, wherein the sensor is a thermal flow rate sensor.

18. The device for detecting the leakage of liquid in the tank according to claim 17, wherein the thermal flow rate sensor comprises a flow rate detection section and a temperature detection section, and the leakage detection means obtains the flow rate subjected to temperature compensation by an electric circuit comprising the flow rate detection section and the temperature detection section.

19. The device for detecting the leakage of liquid in the tank according to claim 18, wherein either of the flow rate detection section and the temperature detection section comprises a heat transfer member which contacts the outer surface of the measurement thin tube.

20. The device for detecting the leakage of liquid in the tank according to claim 12, wherein the liquid level detection means is a pressure sensor which detects a liquid pressure received from the liquid in the tank.

21. The device for detecting the leakage of liquid in the tank according to claim 12, wherein the parameter concerning the shape of the tank is a ratio of an effective cross-sectional area of the tank with respect to the cross-sectional area of the measurement tube in an equal height, and the corrected flow rate is obtained by multiplying the flow rate by the value of the parameter in the liquid level.

22. The device for detecting the leakage of liquid in the tank according to claim 12, wherein the leakage detection means emits a leakage detection signal, when the corrected flow rate is in a range greater than 0 and smaller than a corrected flow rate value obtained during liquid replenishment into the tank or liquid pumping-out from the tank.

23. The device for detecting the leakage of liquid in the tank according to claim 12, wherein the measurement tube passage is formed through a sheath tube and a sensor holder member attached to a lower part of the sheath tube, the sensor holder member holds the sensor and the liquid level detection means, and the measurement thin tube is disposed through the sensor holder member.

24. The device for detecting the leakage of liquid in the tank according to claim 23, wherein a cap member is attached to an upper part of the sheath tube, and the cap member is provided with a communication path for allowing the measurement tube to communicate with the outside and means for fixing the device to an opening of the tank.

25. A device for detecting leakage of liquid in a tank, which is inserted into the tank to detect the leakage of liquid in the tank, comprising:
 a measurement tube passage into which the liquid in the tank is introduced, the measurement tube passage including a measurement tube and a measurement thin tube communicating with the measurement tube and positioned below the measurement tube and having a cross-sectional area smaller than that of the measurement tube;
 a sensor for use in measuring a flow rate of the liquid in the measurement thin tube, the sensor being attached to the measurement thin tube;
 an open/close valve provided in an upper part of the measurement tube; and
 leakage detection means for detecting the leakage of the liquid in the tank based on an integrated value of the flow rate measured using the sensor after closing the open/close valve for a predetermined time and subsequently opening the valve.

26. The device for detecting the leakage of liquid in the tank according to claim 25, wherein the cross-sectional area of the measurement thin tube is 1/50 or less of that of the measurement tube.

27. The device for detecting the leakage of liquid in the tank according to claim 25, wherein the cross-sectional area of the measurement thin tube is 1/100 or less of that of the measurement tube.

28. The device for detecting the leakage of liquid in the tank according to claim 25, wherein the cross-sectional area of the measurement thin tube is 1/300 or less of that of the measurement tube.

29. The device for detecting the leakage of liquid in the tank according to claim 25, wherein the measurement tube and the measurement thin tube are directed substantially in a vertical direction.

30. The device for detecting the leakage of liquid in the tank according to claim 25, wherein the sensor is a thermal flow rate sensor.

31. The device for detecting the leakage of liquid in the tank according to claim 30, wherein the thermal flow rate sensor includes a flow rate detection section and a temperature detection section, and the leakage detection means obtains the flow rate subjected to temperature compensation by an electric circuit comprising the flow rate detection section and the temperature detection section.

32. The device for detecting the leakage of liquid in the tank according to claim 31, wherein either of the flow rate detection section and the temperature detection section comprises a heat transfer member which contacts the outer surface of the measurement thin tube.

33. The device for detecting the leakage of liquid in the tank according to claim 25, wherein the leakage detection means controls opening/closing of the open/close valve.

34. The device for detecting the leakage of liquid in the tank according to claim 25, further comprising liquid level detection means for use in detecting a height of a surface of the liquid, wherein the leakage detection means corrects an integrated value of the flow rate measured using the sensor based on a liquid level detected by the liquid level detection means and a value of a parameter concerning the shape of the tank to obtain a corrected integrated value, and detects the leakage of the liquid in the tank based on the corrected integrated value.

35. The device for detecting the leakage of liquid in the tank according to claim 34, wherein the liquid level detection means is a pressure sensor which detects a liquid pressure received from the liquid in the tank.

36. The device for detecting the leakage of liquid in the tank according to claim 34, wherein the parameter concerning the shape of the tank is a ratio of an effective cross-sectional area of the tank with respect to the cross-sectional area of the measurement tube in an equal height, and the corrected integrated value is obtained by multiplying the integrated value by the value of the parameter in the liquid level.

37. The device for detecting the leakage of liquid in the tank according to claim 25, wherein the leakage detection means emits a leakage detection signal, when the integrated value of the flow rate or the corrected integrated value is not less than a predetermined value.

38. The device for detecting the leakage of liquid in the tank according to claim 25, wherein the measurement tube passage is formed through a sheath tube and a sensor holder member attached to a lower part of the sheath tube, the sensor holder member holds the sensor, and the measurement thin tube is disposed through the sensor holder member.

39. The device for detecting the leakage of liquid in the tank according to claim 38, wherein a cap member is attached to an upper part of the sheath tube, the cap member is provided with a communication path for allowing the measurement tube to communicate with the outside and means for fixing the device to an opening of the tank, and the open/close valve is disposed on the communication path.

40. A device for detecting leakage of liquid in a tank, which is inserted into the tank to detect the leakage of liquid in the tank, comprising:

a measurement tube passage into which the liquid in the tank is introduced, the measurement tube passage including a measurement tube and a measurement thin tube communicating with the measurement tube and positioned below the measurement tube and having a cross-sectional area smaller than that of the measurement tube;

a first sensor for use in measuring a flow rate of the liquid in the measurement thin tube, the first sensor being attached to the measurement thin tube;

a second sensor for use in detecting a direction of a flow of the liquid in the measurement thin tube, the second sensor being attached to the measurement thin tube; and leakage detection means for detecting the leakage of the liquid in the tank based on a combination of the direction of the flow of the fluid detected using the second sensor and the flow rate measured using the first sensor.

41. The device for detecting the leakage of liquid in the tank according to claim 40, wherein the cross-sectional area of the measurement thin tube is 1/50 or less of that of the measurement tube.

42. The device for detecting the leakage of liquid in the tank according to claim 40, wherein the cross-sectional area of the measurement thin tube is 1/100 or less of that of the measurement tube.

43. The device for detecting the leakage of liquid in the tank according to claim 40, wherein the cross-sectional area of the measurement thin tube is 1/300 or less of that of the measurement tube.

44. The device for detecting the leakage of liquid in the tank according to claim 40, wherein the measurement tube and the measurement thin tube are directed substantially in a vertical direction.

45. The device for detecting the leakage of liquid in the tank according to claim 40, wherein the first sensor is a thermal flow rate sensor.

46. The device for detecting the leakage of liquid in the tank according to claim 45, wherein the thermal flow rate sensor includes a flow rate detection section and a temperature detection section, and the leakage detection means obtains the flow rate subjected to temperature compensation by an electric circuit comprising the flow rate detection section and the temperature detection section.

47. The device for detecting the leakage of liquid in the tank according to claim 46, wherein either of the flow rate detection section and the temperature detection section comprises a heat transfer member which contacts the outer surface of the measurement thin tube.

48. The device for detecting the leakage of liquid in the tank according to claim 46, wherein the second sensor comprises a pair of thermometric sensors disposed above and below the flow rate detection section of the thermal flow rate sensor.

49. The device for detecting the leakage of liquid in the tank according to claim 48, wherein either of the pair of thermometric sensors comprises a heat transfer member which contacts the outer surface of the measurement thin tube.

50. The device for detecting the leakage of liquid in the tank according to claim 40, wherein the leakage detection means emits a leakage detection signal, when the direction of the flow of the liquid detected using the second sensor is a downward direction and the flow rate measured using the first sensor is in a predetermined range.

51. The device for detecting the leakage of liquid in the tank according to claim 50, wherein the leakage detection means emits the leakage detection signal in a case where the direction of the flow of the liquid detected using the second sensor is a downward direction and a duration of time within which the flow rate measured using the first sensor is in a predetermined range is not less than a predetermined ratio within a predetermined time.

52. The device for detecting the leakage of liquid in the tank according to claim 40, wherein the measurement tube passage is formed through a sheath tube and a sensor holder member attached to a lower part of the sheath tube, the sensor holder member holds the first and second sensors, and the measurement thin tube is disposed through the sensor holder member.

53. The device for detecting the leakage of liquid in the tank according to claim 52, wherein a cap member is attached to an upper part of the sheath tube, and the cap member is provided with a communication path for allowing the measurement tube to communicate with the outside and means for fixing the device to an opening of the tank.

* * * * *

UNITED STATES PATENT AND TRADEMARK OFFICE
CERTIFICATE OF CORRECTION

PATENT NO.     : 6,920,778 B2
DATED          : July 26, 2005
INVENTOR(S)    : Atsushi Koike et al.

It is certified that error appears in the above-identified patent and that said Letters Patent is hereby corrected as shown below:

<u>Title page,</u>
Item [30], Foreign Application Priority Data, change
"Dec. 14, 2002      (JP) ............................. 2001-381756" to
-- Dec. 14, 2001      (JP) ............................. 2001-381756 --.

Signed and Sealed this

Twenty-second Day of November, 2005

JON W. DUDAS
*Director of the United States Patent and Trademark Office*